US008533481B2

(12) United States Patent
Petrovic et al.

(10) Patent No.: US 8,533,481 B2
(45) Date of Patent: Sep. 10, 2013

(54) EXTRACTION OF EMBEDDED WATERMARKS FROM A HOST CONTENT BASED ON EXTRAPOLATION TECHNIQUES

(75) Inventors: Rade Petrovic, San Diego, CA (US);
Venkatraman Atti, San Diego, CA (US)

(73) Assignee: Verance Corporation, San Diego, CA (US)

( * ) Notice: Subject to any disclaimer, the term of this patent is extended or adjusted under 35 U.S.C. 154(b) by 51 days.

(21) Appl. No.: 13/288,958

(22) Filed: Nov. 3, 2011

(65) Prior Publication Data

US 2013/0117571 A1    May 9, 2013

(51) Int. Cl.
*G06F 21/00* (2013.01)
*H04L 29/06* (2006.01)

(52) U.S. Cl.
USPC ........................................................ 713/176

(58) Field of Classification Search
USPC ........................................................ 713/176
See application file for complete search history.

(56) References Cited

U.S. PATENT DOCUMENTS

| | | |
|---|---|---|
| 3,406,344 A | 10/1968 | Hopper |
| 3,842,196 A | 10/1974 | Loughlin |
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |

(Continued)

FOREIGN PATENT DOCUMENTS

| | | |
|---|---|---|
| CA | 2276638 A1 | 1/2000 |
| EP | 282734 A1 | 9/1988 |

(Continued)

OTHER PUBLICATIONS

Kutter, M., et al., "The watermark copy attack," Proc. of the SPIE: Security and Watermarking of Multimedia Content II, 3971:1-10, Jan. 2000.

(Continued)

*Primary Examiner* — Michael Pyzocha
(74) *Attorney, Agent, or Firm* — Perkins Coie LLP

(57) ABSTRACT

Methods, devices and computer program products facilitate the extraction of embedded watermarks in the presence of content distortions. Subsequent to the detection of a tentative watermark, particular sections of the content are examined to form one or more extrapolated watermarks or watermark segments. Weights are assigned to the extrapolated watermarks or watermark segments, and used in combination with the detected tentative watermark to collectively assess if a desired probability of false detection is satisfied.

32 Claims, 18 Drawing Sheets

(56) References Cited

U.S. PATENT DOCUMENTS

| | | |
|---|---|---|
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |

| Patent | Kind | Date | Inventor |
|---|---|---|---|
| 6,285,774 | B1 | 9/2001 | Schumann et al. |
| 6,289,108 | B1 | 9/2001 | Rhoads |
| 6,290,566 | B1 | 9/2001 | Gabai et al. |
| 6,330,335 | B1 | 12/2001 | Rhoads |
| 6,330,672 | B1 | 12/2001 | Shur |
| 6,332,031 | B1 | 12/2001 | Rhoads et al. |
| 6,332,194 | B1 | 12/2001 | Bloom et al. |
| 6,353,672 | B1 | 3/2002 | Rhoads |
| 6,363,159 | B1 | 3/2002 | Rhoads |
| 6,373,974 | B2 | 4/2002 | Zeng |
| 6,374,036 | B1 | 4/2002 | Ryan et al. |
| 6,381,341 | B1 | 4/2002 | Rhoads |
| 6,385,330 | B1 | 5/2002 | Powell et al. |
| 6,388,712 | B1 | 5/2002 | Shinohara et al. |
| 6,389,152 | B2 | 5/2002 | Nakamura et al. |
| 6,389,538 | B1 | 5/2002 | Gruse et al. |
| 6,400,826 | B1 | 6/2002 | Chen et al. |
| 6,400,827 | B1 | 6/2002 | Rhoads |
| 6,404,781 | B1 | 6/2002 | Kawamae et al. |
| 6,404,898 | B1 | 6/2002 | Rhoads |
| 6,411,725 | B1 | 6/2002 | Rhoads |
| 6,415,040 | B1 | 7/2002 | Linnartz et al. |
| 6,415,041 | B1 | 7/2002 | Oami et al. |
| 6,424,726 | B2 | 7/2002 | Nakano et al. |
| 6,427,012 | B1 | 7/2002 | Petrovic |
| 6,430,301 | B1 | 8/2002 | Petrovic |
| 6,430,302 | B2 | 8/2002 | Rhoads |
| 6,449,367 | B2 | 9/2002 | Van Wie et al. |
| 6,449,496 | B1 | 9/2002 | Beith et al. |
| 6,473,560 | B1 | 10/2002 | Linnartz et al. |
| 6,477,431 | B1 | 11/2002 | Kalker et al. |
| 6,487,301 | B1 | 11/2002 | Zhao |
| 6,490,355 | B1 | 12/2002 | Epstein |
| 6,496,591 | B1 | 12/2002 | Rhoads |
| 6,505,160 | B1 | 1/2003 | Levy et al. |
| 6,510,233 | B1 | 1/2003 | Nakano |
| 6,510,234 | B1 | 1/2003 | Cox et al. |
| 6,512,837 | B1 | 1/2003 | Ahmed |
| 6,523,113 | B1 | 2/2003 | Wehrenberg |
| 6,529,506 | B1 | 3/2003 | Yamamoto et al. |
| 6,530,021 | B1 | 3/2003 | Epstein et al. |
| 6,550,011 | B1 | 4/2003 | Sims, III |
| 6,553,127 | B1 | 4/2003 | Kurowski |
| 6,556,688 | B1 | 4/2003 | Ratnakar |
| 6,557,103 | B1 | 4/2003 | Boncelet, Jr. et al. |
| 6,570,996 | B1 | 5/2003 | Linnartz |
| 6,571,144 | B1 | 5/2003 | Moses et al. |
| 6,574,350 | B1 | 6/2003 | Rhoads et al. |
| 6,577,744 | B1 | 6/2003 | Braudaway et al. |
| 6,584,138 | B1 | 6/2003 | Neubauer et al. |
| 6,590,996 | B1 | 7/2003 | Reed et al. |
| 6,590,997 | B2 | 7/2003 | Rhoads |
| 6,591,365 | B1 | 7/2003 | Cookson |
| 6,592,516 | B2 | 7/2003 | Lee |
| 6,598,162 | B1 | 7/2003 | Moskowitz |
| 6,614,914 | B1 | 9/2003 | Rhoads et al. |
| 6,618,484 | B1 | 9/2003 | Van Wie et al. |
| 6,625,297 | B1 | 9/2003 | Bradley |
| 6,633,653 | B1 | 10/2003 | Hobson et al. |
| 6,636,615 | B1 | 10/2003 | Rhoads et al. |
| 6,647,128 | B1 | 11/2003 | Rhoads |
| 6,647,129 | B2 | 11/2003 | Rhoads |
| 6,654,501 | B1 | 11/2003 | Acharya et al. |
| 6,661,905 | B1 | 12/2003 | Chupp et al. |
| 6,665,419 | B1 | 12/2003 | Oami |
| 6,668,068 | B2 | 12/2003 | Hashimoto |
| 6,671,376 | B1 | 12/2003 | Koto et al. |
| 6,671,388 | B1 | 12/2003 | Op De Beeck et al. |
| 6,674,861 | B1 | 1/2004 | Xu et al. |
| 6,674,876 | B1 | 1/2004 | Hannigan et al. |
| 6,675,146 | B2 | 1/2004 | Rhoads |
| 6,678,389 | B1 | 1/2004 | Sun et al. |
| 6,681,029 | B1 | 1/2004 | Rhoads |
| 6,683,958 | B2 | 1/2004 | Petrovic |
| 6,697,944 | B1 | 2/2004 | Jones et al. |
| 6,700,990 | B1 | 3/2004 | Rhoads |
| 6,704,431 | B1 | 3/2004 | Ogawa et al. |
| 6,707,926 | B1 | 3/2004 | Macy et al. |
| 6,728,390 | B2 | 4/2004 | Rhoads et al. |
| 6,737,957 | B1 | 5/2004 | Petrovic et al. |
| 6,738,495 | B2 | 5/2004 | Rhoads et al. |
| 6,744,906 | B2 | 6/2004 | Rhoads et al. |
| 6,748,360 | B2 | 6/2004 | Pitman et al. |
| 6,751,337 | B2 | 6/2004 | Tewfik et al. |
| 6,757,908 | B1 | 6/2004 | Vogel |
| 6,768,807 | B1 | 7/2004 | Muratani |
| 6,771,797 | B2 | 8/2004 | Ahmed |
| 6,785,399 | B2 | 8/2004 | Fujihara |
| 6,785,401 | B2 | 8/2004 | Walker et al. |
| 6,785,815 | B1 | 8/2004 | Serret-Avila et al. |
| 6,792,542 | B1 | 9/2004 | Lee et al. |
| 6,798,893 | B1 | 9/2004 | Tanaka |
| 6,829,368 | B2 | 12/2004 | Meyer et al. |
| 6,834,344 | B1 | 12/2004 | Aggarwal et al. |
| 6,834,345 | B2 | 12/2004 | Bloom et al. |
| 6,850,626 | B2 | 2/2005 | Rhoads et al. |
| 6,856,693 | B2 | 2/2005 | Miller |
| 6,880,082 | B2 | 4/2005 | Ohta |
| 6,888,943 | B1 | 5/2005 | Lam et al. |
| 6,891,958 | B2 | 5/2005 | Kirovski et al. |
| 6,912,010 | B2 | 6/2005 | Baker et al. |
| 6,912,294 | B2 | 6/2005 | Wang et al. |
| 6,912,315 | B1 | 6/2005 | Wong et al. |
| 6,915,002 | B2 | 7/2005 | Gustafson |
| 6,915,422 | B1 | 7/2005 | Nakamura |
| 6,915,481 | B1 | 7/2005 | Tewfik et al. |
| 6,931,536 | B2 | 8/2005 | Hollar |
| 6,944,313 | B1 | 9/2005 | Donescu |
| 6,947,893 | B1 | 9/2005 | Iwaki et al. |
| 6,952,774 | B1 | 10/2005 | Kirovski et al. |
| 6,954,541 | B2 | 10/2005 | Fan et al. |
| 6,961,854 | B2 | 11/2005 | Serret-Avila et al. |
| 6,973,195 | B1 | 12/2005 | Matsui |
| 6,993,154 | B2 | 1/2006 | Brunk |
| 6,996,249 | B2 | 2/2006 | Miller et al. |
| 7,007,166 | B1 | 2/2006 | Moskowitz et al. |
| 7,020,304 | B2 | 3/2006 | Alattar et al. |
| 7,024,018 | B2 | 4/2006 | Petrovic |
| 7,043,049 | B2 | 5/2006 | Kuzma |
| 7,043,536 | B1 | 5/2006 | Philyaw et al. |
| 7,046,808 | B1 | 5/2006 | Metois et al. |
| 7,054,461 | B2 | 5/2006 | Zeller et al. |
| 7,054,462 | B2 | 5/2006 | Rhoads et al. |
| 7,058,815 | B2 | 6/2006 | Morin |
| 7,068,809 | B2 | 6/2006 | Stach |
| 7,072,492 | B2 | 7/2006 | Ogawa et al. |
| 7,107,452 | B2 | 9/2006 | Serret-Avila et al. |
| 7,142,691 | B2 | 11/2006 | Levy |
| 7,162,642 | B2 | 1/2007 | Schumann et al. |
| 7,164,778 | B1 | 1/2007 | Nakamura et al. |
| 7,167,599 | B1 | 1/2007 | Diehl |
| 7,171,020 | B2 | 1/2007 | Rhoads et al. |
| 7,177,429 | B2 | 2/2007 | Moskowitz et al. |
| 7,197,368 | B2 | 3/2007 | Kirovski et al. |
| 7,206,649 | B2 | 4/2007 | Kirovski et al. |
| 7,224,819 | B2 | 5/2007 | Levy et al. |
| 7,231,061 | B2 | 6/2007 | Bradley |
| 7,289,643 | B2 | 10/2007 | Brunk et al. |
| 7,298,865 | B2 | 11/2007 | Lubin et al. |
| 7,319,759 | B1 | 1/2008 | Peinado et al. |
| 7,321,666 | B2 | 1/2008 | Kunisa |
| 7,334,247 | B1 | 2/2008 | Finseth et al. |
| 7,336,802 | B2 | 2/2008 | Kunisa |
| 7,346,514 | B2 | 3/2008 | Herre et al. |
| 7,369,677 | B2 | 5/2008 | Petrovic et al. |
| 7,389,421 | B2 | 6/2008 | Kirovski et al. |
| 7,450,727 | B2 | 11/2008 | Griesinger |
| 7,454,019 | B2 | 11/2008 | Williams |
| 7,581,103 | B2 | 8/2009 | Home et al. |
| 7,616,776 | B2 | 11/2009 | Petrovic et al. |
| 7,630,497 | B2 | 12/2009 | Lotspiech et al. |
| 7,644,282 | B2 | 1/2010 | Petrovic et al. |
| 7,660,991 | B2 | 2/2010 | Nakamura et al. |
| 7,664,332 | B2 | 2/2010 | Wong et al. |
| 7,693,297 | B2 | 4/2010 | Zhang et al. |
| 7,788,684 | B2 | 8/2010 | Petrovic et al. |
| 7,840,006 | B2 | 11/2010 | Ogawa et al. |
| 7,983,922 | B2 | 7/2011 | Neusinger et al. |

| Patent/Pub No. | Date | Name |
|---|---|---|
| 7,986,806 B2 | 7/2011 | Rhoads |
| 8,055,013 B2 | 11/2011 | Levy et al. |
| 8,059,815 B2 | 11/2011 | Lofgren et al. |
| 8,155,463 B2 | 4/2012 | Wong et al. |
| 8,194,803 B2 * | 6/2012 | Baum et al. .................. 375/343 |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2003/0009671 A1 | 1/2003 | Yacobi et al. |
| 2003/0012403 A1 | 1/2003 | Rhoads et al. |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone, Jr. et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 * | 9/2003 | Rhoads et al. ................ 382/100 |
| 2003/0177359 A1 * | 9/2003 | Bradley ........................ 713/172 |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 * | 4/2004 | Petrovic et al. ................ 725/18 |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0133794 A1 | 7/2004 | Kocher et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0050332 A1 | 3/2005 | Serret-Avila et al. |
| 2005/0071669 A1 | 3/2005 | Medvinsky et al. |
| 2005/0120220 A1 | 6/2005 | Oostveen et al. |
| 2005/0196051 A1 | 9/2005 | Wong et al. |
| 2005/0202781 A1 | 9/2005 | Steelberg et al. |
| 2005/0251683 A1 | 11/2005 | Levy et al. |
| 2006/0005029 A1 | 1/2006 | Petrovic et al. |
| 2006/0056653 A1 * | 3/2006 | Kunisa ........................ 382/100 |
| 2006/0062426 A1 | 3/2006 | Levy et al. |
| 2006/0104477 A1 * | 5/2006 | Isogai et al. .................. 382/100 |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0039018 A1 | 2/2007 | Saslow et al. |
| 2007/0100483 A1 * | 5/2007 | Kentish et al. .................. 700/94 |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0223708 A1 | 9/2007 | Villemoes et al. |
| 2008/0002854 A1 * | 1/2008 | Tehranchi et al. ............. 382/100 |
| 2008/0016360 A1 * | 1/2008 | Rodriguez et al. ............. 713/176 |
| 2008/0031463 A1 | 2/2008 | Davis |
| 2008/0209219 A1 * | 8/2008 | Rhein ........................ 713/176 |
| 2008/0310629 A1 | 12/2008 | Van Der Veen et al. |
| 2008/0310673 A1 * | 12/2008 | Petrovic et al. ............... 382/100 |
| 2008/0313741 A1 | 12/2008 | Alve et al. |
| 2009/0031134 A1 | 1/2009 | Levy |
| 2009/0172405 A1 | 7/2009 | Shiomi et al. |
| 2009/0262932 A1 | 10/2009 | Petrovic |
| 2009/0326961 A1 | 12/2009 | Petrovic et al. |
| 2010/0034513 A1 | 2/2010 | Nakano et al. |
| 2010/0121608 A1 * | 5/2010 | Tian et al. .................... 702/181 |
| 2010/0146286 A1 | 6/2010 | Petrovic et al. |
| 2010/0214307 A1 | 8/2010 | Lee et al. |
| 2010/0226525 A1 | 9/2010 | Levy et al. |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0068898 A1 | 3/2011 | Petrovic et al. |
| 2011/0091066 A1 * | 4/2011 | Alattar ........................ 382/100 |
| 2011/0103444 A1 * | 5/2011 | Baum et al. .................. 375/224 |
| 2011/0123063 A1 | 5/2011 | Delp et al. |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 * | 8/2012 | Villette et al. ................ 704/270 |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |
| 2013/0073065 A1 * | 3/2013 | Chen et al. .................... 700/94 |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |

FOREIGN PATENT DOCUMENTS

| | | |
|---|---|---|
| EP | 372601 A1 | 6/1990 |
| EP | 581317 A2 | 2/1994 |
| EP | 2166725 A1 | 3/2010 |
| GB | 2260246 A | 4/1993 |
| GB | 2292506 A | 2/1996 |
| GB | 2363027 A | 12/2001 |
| JP | 2001245132 A | 0/9200 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 A | 3/2000 |
| JP | 2000083159 A | 3/2000 |
| JP | 2000-174628 A | 6/2000 |
| JP | 2000163870 A | 6/2000 |
| JP | 2000216981 A | 8/2000 |
| JP | 2001022366 A | 1/2001 |
| JP | 2001-119555 A | 4/2001 |
| JP | 2001175270 A | 6/2001 |
| JP | 2001-188549 A | 7/2001 |
| JP | 2001-216763 A | 8/2001 |
| JP | 2001-218006 A | 8/2001 |
| JP | 2001-312570 A | 11/2001 |
| JP | 2001-527660 A | 12/2001 |
| JP | 2002-010057 A | 1/2002 |
| JP | 2002-024095 A | 1/2002 |
| JP | 2002-027223 A | 1/2002 |
| JP | 2002-091465 A | 3/2002 |
| JP | 2002091712 A | 3/2002 |
| JP | 2002135557 A | 5/2002 |
| JP | 2002-165191 A | 6/2002 |
| JP | 2002176614 A | 6/2002 |
| JP | 2002-519916 A | 7/2002 |
| JP | 2002-232693 A | 8/2002 |
| JP | 2002232412 A | 8/2002 |
| JP | 2002319924 A | 10/2002 |
| JP | 2002354232 A | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |
| JP | 2003316556 A | 11/2003 |
| JP | 2004-023786 A | 1/2004 |
| JP | 2004070606 A | 3/2004 |
| JP | 2004-163855 A | 6/2004 |
| JP | 2004173237 A | 6/2004 |
| JP | 2004-193843 A | 7/2004 |
| JP | 2004194233 A | 7/2004 |
| JP | 2004-328747 A | 11/2004 |
| JP | 2005051733 A | 2/2005 |
| JP | 2005-094107 A | 4/2005 |
| JP | 2005525600 A | 8/2005 |
| JP | 20080539669 | 11/2008 |
| JP | 20100272920 | 12/2010 |
| KR | 20100009384 A | 1/2010 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 01-55889 | 8/2001 |
| WO | 0197128 A1 | 12/2001 |
| WO | 0219589 A1 | 3/2002 |
| WO | 0223883 A2 | 3/2002 |
| WO | 02095727 | 11/2002 |
| WO | 03052598 A1 | 6/2003 |
| WO | 2005-027501 | 3/2005 |
| WO | 2006051043 | 5/2006 |
| WO | 2006051043 A1 | 5/2006 |
| WO | 2006116394 | 11/2006 |
| WO | 2006116394 A2 | 11/2006 |
| WO | 2010073236 | 7/2010 |
| WO | 2010073236 A1 | 7/2010 |
| WO | 2013067439 A1 | 5/2013 |

OTHER PUBLICATIONS

Kuznetsov, A.V., et al., "An error correcting scheme for defective memory," IEEE Trans. Inf. Theory, 6(4):712-718, Nov. 1978 (7 pages).

Lacy, J., et al., "Intellectual property protection systems and digital watermarking," Proceedings: Information Hiding, Second International Workshop, Portland, Oregon, pp. 158-168, 1998.

Lin, E.T., et al., "Detection of image alterations using semi-fragile watermarks," Proceedings of the SPIE International Conference on Security and Watermarking of Multimedia Contents II, Jan. 2000 (12 pages).

Lin, P.L, et al., "Robust transparent image watermarking system with spatial mechanisms," The Journal of Systems and Software, 50:107-116, Feb. 2000.

Lotspeich, J., "The Advanced Access Content System's Use of Digital Watermarking," MCPS '06, Oct. 28, 2006, pp. 19-21.

Lu, C.S., et al., "Oblivious cocktail watermarking by sparse code shrinkage: A regional-and global-based scheme," IEEE Transactions on Multimedia, 4(2):209-224, Dec. 2000.

Maehara, F., et al., "A proposal of multimedial home education terminal system based on flash-squeak OS," Technical report of the institute of image information and television engineers, 28(43):21-24, Jul. 2004.

Mason, A. J., et al., "User requirements for watermarking in broadcast applications," IEEE Conference Publication, International Broadcasting Convention (BC 2000), Amsterdam, Sep. 8-12, 2000 (7 pages).

Mintzer, F., et al., "If one watermark is good, are more better?," Acoustics, Speech, and Signal Processing, ICASSP, 4:2067-2069, Mar. 1999.

Mobasseri, B.G., et al. "Content authentication and tamper detection in digital video," Image Processing Proceedings, International Conference, 1:458-461, 2000.

Moulin, P., et al., "Detection-theoretic analysis of desynchronization attacks in watermarking," Technical Report MSR-TR-2002-24, Microsoft Corporation, Mar. 2002.

Muranoi, R., et al., "Video retrieval method using shotID for copyright protection systems," Proc. SPIE Multimedia Storage and Archiving Systems III, 3527:245-252, Nov. 1998.

Nikolaidis, N., et al., "Watermark detection: benchmarking perspectives," 2002 IEEE Conference on Multimedia and Expo, 2002 (4 pages).

Office Action dated Mar. 18, 2011 for European Patent Application No. 03774648.4 (6 pages).

Office Action dated Jul. 21, 2011 for Japanese Patent Application No. 2008-508985 (6 pages).

Office Action dated Mar. 16, 2012 for Japanese Patent Application No. 2008-508985 (17 pages).

Office Action dated May 8, 2012 for Japanese Patent Application No. 2009-522802 (4 pages).

Park, J.H., et al., "Robust and fragile watermarking techniques for documents using bidirectional diagonal profiles," Information and Communications Security: Third International Conference, Xian, China, Nov. 2001, pp. 483-494.

Perez-Gonzalez, F., et al., "Approaching the capacity limit in image watermarking a perspective on coding techniques for data hiding applications," Signal Processing, 6(81):1215-1238 Jun. 2001.

Petitcolas, F., et al., "The blind pattern matching attack on watermark systems," IEEE Trans. Signal Processing, Apr. 2003 (4 pages).

Petitcolas, F.A.P., et al., "Attacks on copyright marking systems," Second Workshop on Information Hiding, Lecture Notes in Computer Science, Portland, Oregon, pp. 218-238, Apr. 1998.

Philips Research Liquid Audio Fraunhofer Institute, "Digital Audio Screening Technology for Phased Rollout," Version 1.00, May 1999 (38 pages).

Pytlak, J.,"Anti-piracy coding," URL: http://www.tele.com/pipermail/tig/2003-November/003842.html; Nov. 2003 (2 pages).

RSA Laboratories, "Frequently asked questions about today's cryptography," Version 4.1, May 2000 (37 pages).

Schneier, B., "Applied cryptography, second edition: protocols, algorithms and source code in C," Oct. 1995 (10 pages).

Shih, F.Y., et al., "Combinational, image watermarking in the spatial and frequency domains," Pattern Recognition, 36:696-975, May 2002.

Solanki, K., et al., "Robust image-adaptive data hiding: modeling, source coding and channel coding," 41st Allerton Conference on Communications, Control and Computing, Oct. 2003 (10 pages).

Steinebach, M., et al., "StirMark benchmark: audio watermarking attacks," International Conference on Information Technology: Coding and Computing (ITCC 2001), Las Vegas, Nevada, Apr. 2001 (6 pages).

Tanaka, K., et al., "Secret transmission method of character data in motion picture communication," SPIE Visual Communications and Image Processing '91, 1605:646-649, 1991.

Tsai, M.J., et al., "Wavelet packet and adaptive spatial transformation of watermark for digital image authentication," IEEE Image Processing, 2000 International Conference, 1:450-453, 2000 (4 pages).

Verance Corporation, "Confirmedia," PowerPoint presentation made to National Association of Broadcasters; Apr. 24, 2001 (40 pages).

Xu, C., et al., "Applications of digital watermarking technology in audio signals," Journal of Audio Eng. Soc., 10 (47):805-812, Oct. 1999.

Yeung, M. M., et al., "An invisible watermarking technique for image verification," Image Processing, International Conference Proceedings, 2:680-683, Oct. 26-29, 1997.

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

"Advanced Access Content System (AACS), Pre-recorded Video Book," Revision 0.951, Sep. 2009 (88 pages).

"Microsoft response to CfP for technology solutions to screen digital audio content for LCM acceptance," Microsoft Corporation, May 23, 1999.

"TASK AC122—copy protection for distribution services," Http://acad.bg/i/WISE/english/rd/partners/acts/areal/ac122-t.html, Jul. 1, 1997.

Adelsbach, A., et al., "Proving Ownership of Digital Content," Proc. 3rd Int. Workshop on Information Hiding, 1768:117-133, Sep. 1999.

Aggarwal, A., et al., "Multi-Layer Grid Embeddings," Foundations of Computer Science, 26th Annual Symposium on Foundations of Computer Science, 85:186-196, Oct. 1985.

Aris Technologies, Inc. "Audio Watermarking System to Screen Digital Audio Content for LCM Acceptance," May 1999 (17 pages).

Barreto, P.S.L.M., et al. "Toward Secure Public-Key Blockwise Fragile Authentication Watermarking," IEEE Proceedings Vision, Image, and Signal Processing, 149(2):57-62, Apr. 2002.

Boney, L., et al., "Digital Watermarks for Audio Signals," Dept. of Electrical Engineering, Univ. of Minnesota, Mar. 1996 (4 pages).

Cappellini, V., et al. "Robust Frame-based Watermarking for Digital Video," Proceedings of the 12th International Workshop on Database and Expert Systems Applications, Sep. 2001 (5 pages).

Caronni, G., "Assuring Ownership Rights for Digital Images," Proceedings of reliable IT systems VIS 95, Vieweg Publishing Company, Germany, 1995 (10 pages).

Chen, B., et al., "Quantization index modulation: a class of provably good methods for digital watermarking and information embedding," IEEE Transactions on Information Theory, 47(4):1423-1443 May 2001.

Chou, J., et al., "A Robust Blind Watermarking Scheme based on Distributed Source Coding Principles", Multimedial 2000 Proceedings of the eighth ACM international conference on multimedia, Los Angeles, California, 2000 (8 pages).

Chou, J., et al., "A Robust Optimization Solution to the Data Hiding Problem using Distributed Source Coding Principles," Pro. SPIE, 3971, San Jose, California, Jan. 2000 (10 pages).

Cinea, Inc., "Forensic watermarking deterring video piracy," 2004, (9 pages). [http://www.cinea.com/whitepapers/forensic_watermarking.pdf].

Costa, M., "Writing on Dirty Paper," IEEE Trans. on Info. Theory, 29(3):439-441, May 1983.

Cox, I. J., et al., "Some general methods for tampering with watermarks," IEEE Journal on Selected Areas in Communications, 16(4): 587-593, May 1998.

Coxford, A., et al., "Advanced Mathematics: A Preparation for Calculus, Second Edition," Harcourt Brace Jovanovish, Inc., 1978 (14 pages).

Das, et al., "Distributed Priority Queues on Hybercube Architectures," IEEE, 1996, pp. 620-627.

Davidson, M.F., "Music File Filter," Sony Music, New York, May 23, 1999 (2 pages).

Digimarc Corporation, "Digimarc Watermarking Guide," 1999 (22 pages).

Dittmann, J., "Combining digital watermarks and collusion secure fingerprints for customer copy monitoring," Proc. IEEE Seminar on Secure Images and Image Authentication, Apr. 2000 (6 pages).

Dittmann, J., et al., "Combining digital watermarks and collusion secure fingerprints for digital images," Proc. SPIE 3657:171-182, Jan. 1999.

Epp, L.W., et al., "Generalized scattering matrices for unit cell characterization of grid amplifiers and device de-embedding," IEEE, 2:1288-1291, Jun. 1995.

European Search Report dated Nov. 10, 2010 for European Patent Application No. 03774648.4, filed Oct. 7, 2003 (5 pages).

European Search Report dated Apr. 12, 2012 for European Patent Application No. 07836262.1 filed Jul. 25, 2007 (12 pages).

Furon, T., et al., "An asymmetric watermarking method," IEEE Trans. Signal Processing, 4(51):981-995, Apr. 2003.

Guth, H.J., et al., "Error-and collusion-secure fingerprinting for digital data," Proc. 3rd Int. Workshop on Information Hiding, LNCS 1768:134-145, Sep./Oct. 1999.

Hartung, F., et al., "Digital watermarking of MPEG-2 coded video in the bitstream domain," Proc. IEEE Int. Conf. on Acoustics, Speech and Signal Processing, 4:2621-2624, Apr. 1997.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Heegard, C., et al., "On the capacity of computer memory with defects," IEEE Trans. Info. Theory, 5(IT-29):731-739, Sep. 1983.

International Search Report and Written Opinion dated Aug. 14, 1998 for International Application No. PCT/US1998/009587, filed May 12, 1998 (3 pages).

International Search Report and Written Opinion dated Aug. 22, 2007 for International Application No. PCT/US2006/031267, filed Aug. 9, 2006 (2 pages).

International Search Report and Written Opinion dated Feb. 14, 2002 for International Application No. PCT/US2001/026505, filed Aug. 27, 2001 (2 pages). [8022.WO00].

International Search Report and Written Opinion dated Jan. 4, 2008 for International Application No. PCT/US2006/015615, filed Apr. 25, 2006 (5 pages).

International Search Report and Written Opinion dated Mar. 28, 2012 for International Application No. PCT/US2011/051855, filed Sep. 15, 2011 (8 pages).

International Search Report and Written Opinion dated May 13, 2008 for International Application No. PCT/US2006/025090, filed Jun. 27, 2006 (2 pages).

International Search Report and Written Opinion dated May 19, 2004 for International Application No. PCT/US2003/031816, filed Apr. 29, 2004 (3 pages).

International Search Report and Written Opinion dated May 29, 2008 for International Application No. PCT/US2006/015410, filed Apr. 21, 2006 (6 pages).

International Search Report and Written Opinion dated Sep. 26, 2008 for International Application No. PCT/US2007/016812, filed Jul. 25, 2007 (6 pages).

International Search Report and Written Opinion dated Apr. 24, 2012 for International Application No. PCT/US2011/051857, filed Sep. 15, 2011 (9 pages).

Jacobsmeyer, J., et al., "Introduction to error-control coding," Pericle Communications Company, 2004 (16 pages).

Kalker, T., et al., "A security risk for publicly available watermark detectors," Proc. Benelux Info. Theory Symp., Veldhoven, The Netherlands, May 1998.

Kalker, T., et al., "System issues in digital image and video watermarking for copy protection," Proc. IEEE Int. Conf. on Multimedia Computing and Systems, pp. 562-567, Jun. 1999.

Kang, X., et al., "A DWT-DFT composite watermarking scheme robust to both affine transform and JPEG compression," IEEE Transactions on Circuits and Systems for Video Technology, 8(13):776-786 Aug. 2003.

Kim, T.Y., et al., "An asymmetric watermarking system with many embedding watermarks corresponding to one detection watermark," IEEE Signal Processing Letters, 3(11):375-377, Mar. 2004.

Kirovski, D., et al., "Multimedia content screening using a dual watermarking and fingerprinting system," Proceedings of the tenth ACM international conference, pp. 372-381, 2002.

Kirovski, D., et al., "Randomizing the replacement attack," ICASSP, pp. 381-384, 2004.

Kirovski, D., et al., "Multimedia content screening using a dual watermarking and fingerprinting system," Multimedia '02 Proceedings of the tenth ACM international conference on Multimedia, 2002 (11 pages).

Kocher, P., et al., "Self-Protecting Digital Content: A Technical Report from the CRI Content Security Research Initiative," Cryptography Research, Inc. (CRI), 2002-2003 pp. 1-14.

"Content Protection—Self Protecting Digital Content," http://www.cryptography.com/technology/spdc/index.html, May 2010 (1 page).

Bangaleea, R., et al., "Performance improvement of spread spectrum spatial-domain watermarking scheme through diversity and attack characterisation," IEEE Africon, pp. 293-298, 2002.

European Search Report dated Jul. 3, 2012 for European Patent Application No. 12150742.0, filed Oct. 7, 2003 (5 pages).

European Search Report dated Oct. 24, 2012 for European Patent Application No. 06758537.2, filed Apr. 21, 2006 (6 pages).

European Search Report dated Oct. 31, 2012 for European Patent Application No. 06758577.8, filed Apr. 25, 2006 (6 pages).

International Search Report and Written Opinion dated Apr. 8, 2013 for International Application No. PCT/US2012/069306, filed Dec. 12, 2012 (12 pages).

International Search Report and Written Opinion dated Mar. 25, 2013 for International Application No. PCT/US2012/069302, filed Dec. 12, 2012 (22 pages).

International Search Report and Written Opinion dated Feb. 28, 2013 for International Application No. PCT/US2012/066138, filed Nov. 20, 2012 (11 pages).

International Search Report and Written Opinion dated Mar. 14, 2013 for International Application No. PCT/US2012/069308, filed Dec. 12, 2012 (10 pages).

International Search Report and Written Opinion dated Mar. 18, 2013 for International Application No. PCT/US2012/063431, filed Nov. 2, 2012 (10 pages).

Kirovski, D., et al., "Robust spread-spectrum audio watermarking," IEEE International Conference on Acoustics, Speech, and Signal Processing, 3:1345-1348, 2001.

Office Action dated Nov. 26, 2012 for Japanese Patent Application No. 2011-114667 (8 pages).

Office Action dated Nov. 28, 2012 for Japanese Patent Application No. 2011-114666 (8 pages).

Seok, J., et al., "A novel audio watermarking algorithm for copyright protection of digital audio," ETRI Journal, 24(3):181-189, Jun. 2002.

Wolfgang, R., et al., "Perceptual watermarks for digital images and video," Proceedings of the IEEE, 87(7):1108-1126, Jul. 1999.

* cited by examiner

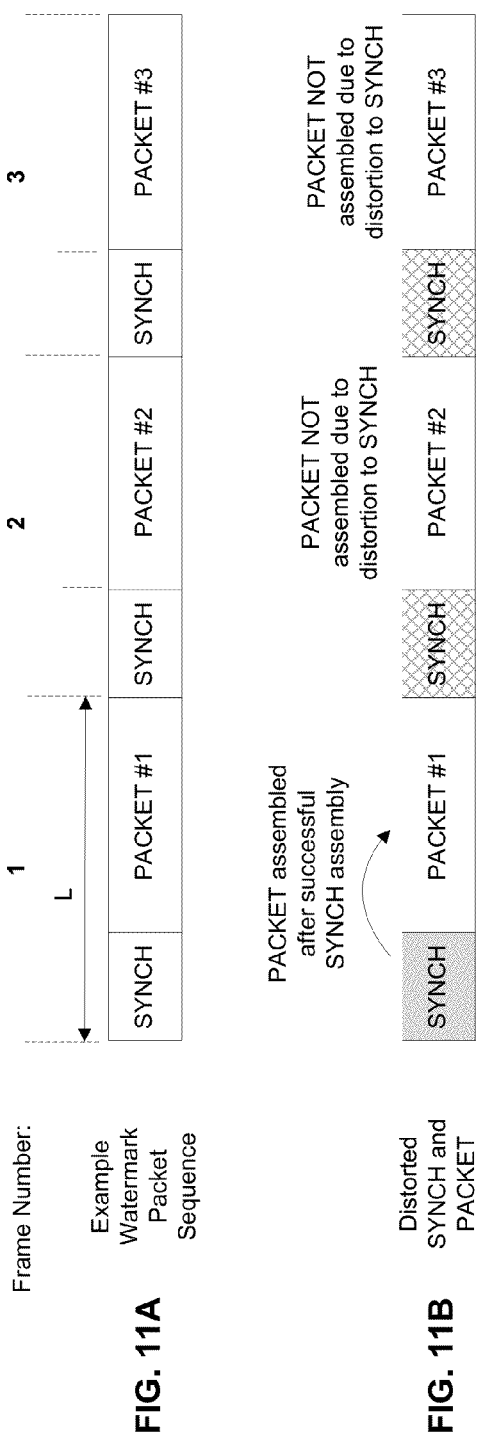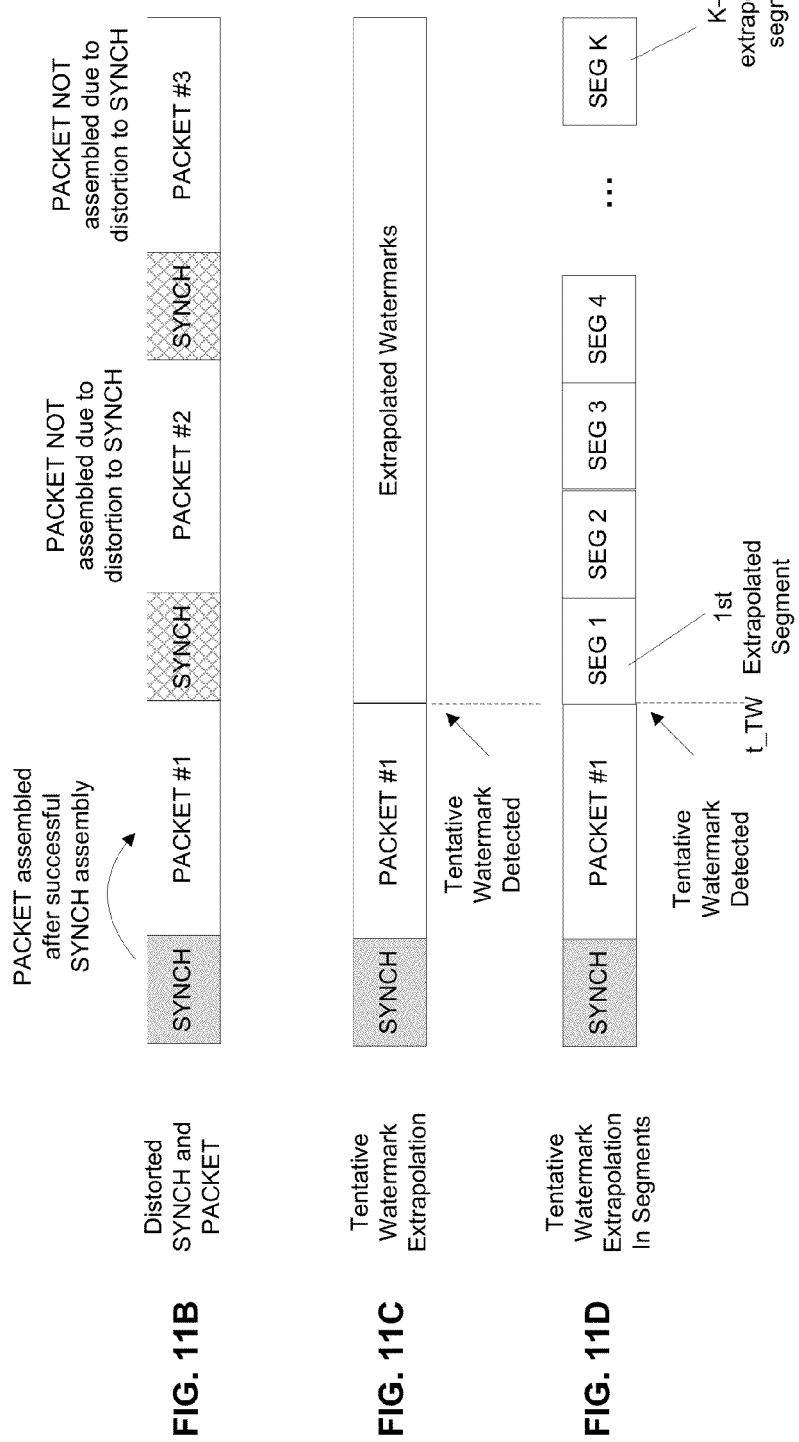

EXTRACTION OF EMBEDDED WATERMARKS FROM A HOST CONTENT BASED ON EXTRAPOLATION TECHNIQUES

FIELD OF INVENTION

The present application generally relates to the field of content management. More particularly, the disclosed embodiments relate to embedding and extraction of watermarks from media content.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Watermarks are substantially imperceptible signals embedded into a host content. The host content may be any one of audio, still image, video or any other content that may be stored on a physical medium or transmitted or broadcast from one point to another. Watermarks are designed to carry auxiliary information without substantially affecting fidelity of the host content, or without interfering with normal usage of the host content. For this reason, watermarks are sometimes used to carry out covert communications, where the emphasis is on hiding the very presence of the hidden signals. In addition, other widespread applications of watermarks include prevention of unauthorized usage (e.g., duplication, playing and dissemination) of copyrighted multi-media content, proof of ownership, authentication, tampering detection, content integrity verification, broadcast monitoring, transaction tracking, audience measurement, triggering of secondary activities such as interacting with software programs or hardware components, communicating auxiliary information about the content such as caption text, full title and artist name, or instructions on how to purchase the content, and the like. The above list of applications is not intended to be exhaustive, as many other present and future systems can benefit from co-channel transmission of main and auxiliary information.

Designing a watermarking system requires reaching the proper balance between transparency (imperceptibility) of embedded watermarks, robustness of embedded watermarks (i.e., the watermark's ability to withstand intentional and unintentional signal distortions) and security requirements of the system (i.e., the extent to which embedded watermarks can evade detection, deletion and/or manipulation by unauthorized parties). Such a balancing act must be carried out while limiting the average and/or maximum number of processing operations (i.e., the processing load) and memory usage below particular levels that are often imposed for practical software and/or hardware implementations of watermark embedder and/or a watermark extractor.

SUMMARY

This section is intended to provide a summary of certain exemplary embodiments and is not intended to limit the scope of the embodiments that are disclosed in this application.

One aspect of the disclosed embodiments relates to a method that includes receiving a watermark frame comprising a synchronization portion and a packet portion, the watermark frame having been obtained from a content embedded with watermarks, comparing the received synchronization portion to one or more pre-distorted synchronization templates, and evaluating the received watermark frame based on at least an outcome of the comparing.

In one example embodiment, the one or more pre-distorted synchronization templates are generated, at least in part, by generating a plurality of pilot contents, embedding the plurality of pilot contents with watermarks comprising a synchronization portion, distorting the plurality of embedded pilot contents with one or more distortions, and obtaining candidate pre-distorted synchronization templates from the plurality of distorted pilot contents. In one example variation, generation of the one or more synchronization templates further includes receiving a subset of the plurality of embedded pilot contents after transmission through a transmission medium, where the transmission medium introduces one or more distortions into the subset of the plurality of embedded pilot contents. Further, generation of the one or more synchronization templates also includes comparing synchronization portions of the received subset of the plurality of pilot contents with each of the candidate pre-distorted synchronization templates, and selecting one or more candidate pre-distorted synchronization templates that match, to within a predefined tolerance, the synchronization portions of the received subset of the plurality of pilot contents.

In one example embodiment, the comparing produces an error count for each of the one or more pre-distorted synchronization templates indicative of the number of mismatched symbols between the received synchronization portion of the watermark frame and each of the one or more pre-distorted synchronization templates.

In another example embodiment, the comparing produces a correlation value for each of the one or more pre-distorted synchronization templates indicative of how well the synchronization portion of the watermark frame matches each of the one or more pre-distorted synchronization templates.

According to another embodiment, the above noted method further includes, subsequent to the comparing, identifying a pre-distorted synchronization template that best matches the received synchronization portion of the watermark frame, and selecting one or more distortion types and distortion amounts associated with the identified pre-distorted synchronization template to represent the distortion(s) present in the content. In one embodiment, the above noted method further comprises organizing the candidate pre-distorted synchronization templates in a pre-sorted order for each type of distortion and/or combination of distortions. In such an embodiment, the pre-sorted order ranks a first candidate pre-distorted synchronization template with a higher likelihood of representing a realistic content distortion higher than a second candidate pre-distorted synchronization template with a smaller likelihood of representing a realistic content distortion.

In yet another embodiment, the one or more pre-distorted synchronization templates correspond to a particular granularity of search over a distortion space. In one variation of the above embodiment, a number of the one or more pre-distorted synchronization templates is selected to reduce one or both of: a probability of false watermark detection, and/or computational resources needed for evaluating the received watermark frame.

According to another embodiment, the evaluating produces an indication of presence of one of: a tentative watermark representing a candidate watermark with an associated probability of false watermark detection that exceeds a desired probability of false watermark detection, or a conclusive watermark representing a watermark detected with an associated probability of false watermark detection that is smaller than or equal to a desired probability of false watermark detection. In another embodiment, the evaluating identifies one or more distortion types and distortion amounts present in the content.

In another embodiment, the content comprises at least a first and a second watermark message and the first watermark message has a smaller payload than the second watermark message. In this embodiment, evaluating the received watermark frame results in detection of the first watermark message as a tentative watermark, and a content distortion estimate obtained for the tentative watermark is used to extract the second watermark message.

Another aspect of the disclosed embodiments relates to a device that comprises a receiver configured to receive a watermark frame comprising a synchronization portion and a packet portion, the watermark frame having been obtained from a content embedded with watermarks. The device also includes a comparator configured to compare the received synchronization portion to one or more pre-distorted synchronization templates, and an evaluator configured to evaluate the received watermark frame based on at least an outcome of the comparator.

Another embodiment relates to a device that includes a watermark embedder configured to embed a plurality of pilot contents with watermarks comprising a synchronization portion, a distortion processing component configured to distort the plurality of embedded pilot contents with one or more distortions, and a watermark extractor configured to produce candidate pre-distorted synchronization templates from the plurality of distorted pilot contents. In one embodiment, such a device further comprises a receiver configured to receive a subset of the plurality of embedded pilot contents after transmission through a transmission medium, wherein the transmission medium introduces one or more distortions into the subset of the plurality of embedded pilot contents, and a template matching components configured to compare synchronization portions of the received subset of the plurality of pilot contents with each of the candidate pre-distorted synchronization templates and to select one or more candidate pre-distorted synchronization templates that match, to within a predefined tolerance, the synchronization portions of the received subset of the plurality of pilot contents.

Another aspect of the disclosed embodiments relates to a device that includes a processor, and a memory comprising processor executable code. The processor executable code, when executed by the processor, configures the device to receive a watermark frame comprising a synchronization portion and a packet portion, the watermark frame having been obtained from a content embedded with watermarks, compare the received synchronization portion to one or more pre-distorted synchronization templates, and evaluate the received watermark frame based on at least an outcome of the comparing.

Another aspect of the disclosed embodiments relates to a computer program product, embodied on a non-transitory computer readable medium, that comprises program code for receiving a watermark frame comprising a synchronization portion and a packet portion, the watermark frame having been obtained from a content embedded with watermarks. The computer program product also includes program code for comparing the received synchronization portion to one or more pre-distorted synchronization templates and program code for evaluating the received watermark frame based on at least an outcome of the comparing.

Another aspect of the disclosed embodiments relates to a method that includes extracting a plurality of tentative watermarks from an embedded host content, where each tentative watermark represents a candidate watermark with an associated probability of false watermark detection that exceeds a desired probability of false watermark detection. This method also includes obtaining estimated distortion information associated with one or more distortions present in the embedded host contents using at least two of the extracted tentative watermarks, and based on the estimated distortion information, obtaining one or more pre-distorted watermark templates. The method further includes re-evaluating at least one of the extracted tentative watermarks using the one or more pre-distorted watermark templates.

In one embodiment, the re-evaluating results in detection of a watermark with an improved probability of false watermark detection compared to probability of false watermark detection associated with each of the extracted tentative watermarks. In another embodiment, the re-evaluating results in detection of a conclusive watermark with an associated probability of false watermark detection that is smaller than or equal to the desired probability of false watermark detection. In still another embodiment, each of the pre-distorted watermark templates represents a particular type and a particular amount of at least one type of distortion that can contaminate the embedded host content. According to another embodiment, the re-evaluating results in an improved estimation of distortions present in the embedded host content.

In one embodiment, the above noted method further includes, prior to obtaining one or more pre-distorted watermark templates, determining whether or not the estimated distortion information corresponds to a distortion amount that exceeds a particular distortion threshold. In this embodiment, the one or more pre-distorted watermark templates are obtained only if the estimated distortion information corresponds to a distortion amount that does not exceed the particular distortion threshold.

In another embodiment, the estimated distortion information is obtained using two or more synchronization portions of the at least two extracted tentative watermarks. In this embodiment, the estimated distortion information is obtained by comparing a spacing between the at least two of the extracted tentative watermarks to a nominal spacing of watermarks associated with an un-distorted content. In yet another embodiment, the extracting of each of the tentative watermarks comprises detecting a synchronization portion of the tentative watermark that triggers extraction of a packet portion of the tentative watermark.

Another aspect of the disclosed embodiments relates to a device that includes an extractor configured to extract a plurality of tentative watermarks from an embedded host content, where each tentative watermark represents a candidate watermark with an associated probability of false watermark detection that exceeds a desired probability of false watermark detection. Such a device also includes a distortion estimator configured to obtain estimated distortion information associated with one or more distortions present in the embedded host contents using at least two of the extracted tentative watermarks and to obtain one or more pre-distorted watermark templates. This device further includes an evaluator configured to re-evaluate at least one of the extracted tentative watermarks using the one or more pre-distorted watermark templates.

Another aspect of the disclosed embodiments relates to a device that comprises a processor and a memory that includes processor executable code. The processor executable code, when executed by the processor, configures the device to extract a plurality of tentative watermarks from an embedded host content, where each tentative watermark representing a candidate watermark with an associated probability of false watermark detection that exceeds a desired probability of false watermark detection. The processor executable code, when executed by the processor, also configures the device to obtain estimated distortion information associated with one or more distortions present in the embedded host contents using at least two of the extracted tentative watermarks, and based on the estimated distortion information, to obtain one or more pre-distorted watermark templates. The processor executable code, when executed by the processor, further configures the device to re-evaluate at least one of the extracted tentative watermarks using the one or more pre-distorted watermark templates.

Another aspect of the disclosed embodiments relates to a computer program product, embodied on a non-transitory computer readable medium that includes program code for extracting a plurality of tentative watermarks from an embedded host content, where each tentative watermark representing a candidate watermark with an associated probability of false watermark detection that exceeds a desired probability of false watermark detection. The computer program product also includes program code for obtaining estimated distortion information associated with one or more distortions present in the embedded host contents using at least two of the extracted tentative watermarks, and program code for, based on the estimated distortion information, obtaining one or more pre-distorted watermark templates. The computer program product further includes program code for re-evaluating at least one of the extracted tentative watermarks using the one or more pre-distorted watermark templates.

Another aspect of the disclosed embodiments relates to a method that includes extracting a tentative watermark from an embedded host content, where the tentative watermark represents a candidate watermark with an associated probability of false watermark detection that exceeds a desired probability of false watermark detection. This method also includes obtaining estimated distortion information indicative of a coarse value of a particular distortion, or combination of distortions, present in the embedded host content using the extracted tentative watermark and selecting one or more supplementary pre-distorted watermark templates that correspond to one or more distortion values in the vicinity of the coarse value. This method further includes re-evaluating the extracted tentative watermark using the selected one or more supplementary pre-distorted watermark templates.

In one embodiment, obtaining the estimated distortion information comprises selecting a plurality of coarse pre-distorted watermark templates that correspond to a range of distortion values of a particular distortion, or combination of distortions, with coarse granularity, comparing the extracted tentative watermark to each of the plurality of coarse pre-distorted watermark templates, and obtaining the estimated distortion information by identifying a first coarse pre-distorted watermark template that best matches the extracted tentative watermark. In one variation of this embodiment, the plurality of coarse pre-distorted watermark templates are selected at random from among a larger collection of pre-distorted watermark templates. In another variation of this embodiment, the plurality of coarse pre-distorted watermark templates are selected to correspond to one or more types of distortions that are likely to be present in the embedded host content.

According to another embodiment, the one or more supplementary pre-distorted watermark templates are selected to enable a search of distortion space in the vicinity of the coarse value with a fine granularity. In still another embodiment, the re-evaluating results in an improved estimate of the distortions present in the embedded host content. In one variation, the improved estimate is utilized to extract additional watermarks from the embedded host content. In one embodiment, the re-evaluating results in detection of a watermark with an improved probability of false watermark detection compared to probability of false watermark detection associated with the extracted tentative watermark. In another embodiment, the re-evaluating results in detection of a conclusive watermark with an associated probability of false watermark detection that is less than or equal to a desired probability of false watermark detection.

In another embodiment, the re-evaluating comprises comparing the one or more supplementary pre-distorted watermark templates to the extracted tentative watermark, producing an error count associated with each comparison, where the error count representing how well the corresponding supplementary pre-distorted watermark template matches the extracted tentative watermark, and selecting the supplementary pre-distorted watermark template that corresponds to smallest produced error count. In another embodiment, the one or more supplementary pre-distorted watermark templates are selected one-at-a-time in an iterative fashion.

Another aspect of the disclosed embodiments relates to a device that includes an extractor configured to extract a tentative watermark from an embedded host content, where the tentative watermark represents a candidate watermark with an associated probability of false watermark detection that exceeds a desired probability of false watermark detection. This device further includes a distortion estimator configured to obtain estimated distortion information indicative of a coarse value of a particular distortion, or combination of distortions, present in the embedded host content using the extracted tentative watermark, and to select one or more supplementary pre-distorted watermark templates that correspond to one or more distortion values in the vicinity of the coarse value. This device additionally comprises an evaluator configured to re-evaluate the extracted tentative watermark using the selected one or more supplementary pre-distorted watermark templates.

According to another aspect of the disclosed embodiments, a device is provided that includes a processor and a memory that includes processor executable code. The processor executable code, when executed by the processor, configures the device to extract a tentative watermark from an embedded host content, where the tentative watermark represents a candidate watermark with an associated probability of false watermark detection that exceeds a desired probability of false watermark detection. The processor executable code, when executed by the processor, also configures the device to obtain estimated distortion information indicative of a coarse value of a particular distortion, or combination of distortions, present in the embedded host content using the extracted tentative watermark, and to select one or more supplementary pre-distorted watermark templates that correspond to one or more distortion values in the vicinity of the coarse value. The processor executable code, when executed by the processor, further configures the device to re-evaluate the extracted tentative watermark using the selected one or more supplementary pre-distorted watermark templates.

Another aspect of the disclosed embodiments relates to a computer program product, embodied on a non-transitory computer readable medium, that includes program code for extracting a tentative watermark from an embedded host content, where the tentative watermark represents a candidate watermark with an associated probability of false watermark detection that exceeds a desired probability of false watermark detection. The computer program product also includes program code for obtaining estimated distortion information indicative of a coarse value of a particular distortion, or combination of distortions, present in the embedded host content using the extracted tentative watermark, and program code for selecting one or more supplementary pre-distorted watermark templates that correspond to one or more distortion values in the vicinity of the coarse value. The computer program product further includes program code for re-evaluating the extracted tentative watermark using the selected one or more supplementary pre-distorted watermark templates.

Another aspect of the disclosed embodiments relates to a method that includes extracting a tentative watermark from an embedded host content, where the tentative watermark represents a candidate watermark with an associated probability of false watermark detection that exceeds a desired probability of false watermark detection. The method also includes forming one or more extrapolated watermarks by obtaining symbols of potential watermark frames that are positioned within the embedded host content at a predefined location relative to the extracted tentative watermark, and determining if the extrapolated watermarks, when collectively assessed with the detected tentative watermark, satisfy a desired probability of false watermark detection. In one embodiment, the symbols of the potential watermark frames are positioned within the embedded host content at pre-defined temporal and/or spatial locations relative to the extracted tentative watermark.

In another embodiment, determining if the extrapolated watermarks satisfy a desired probability of false watermark detection comprises determining a number of erroneous symbols in one or more of the extrapolated watermarks, assigning weights to the one or more of the extrapolated watermarks based, at least in-part, on the determined number of erroneous symbols, and determining if the weighted extrapolated watermark(s), when combined with the detected tentative watermark, satisfy the desired probability of false watermark detection. In this embodiment, the number of erroneous symbols in each extrapolated watermark can be determined by one or more of: a comparison of the extrapolated watermark symbols to symbols of the extracted tentative watermark, performing an error correction code decoding of the extrapolated watermark symbols, and/or a comparison of the extrapolated watermarks to one or more pre-distorted watermark templates.

In one embodiment, forming each of the extrapolated watermarks comprises obtaining a number of erroneous symbols in one or more segments, assigning weights to each of the one or more segments based, at least in-part, on the number of erroneous symbols in each of the one or more segments, combining the assigned weights associated with the one or more segments to produce one or more weighted extrapolated watermark sections, and determining if the weighted extrapolated watermark sections, when combined with the detected tentative watermark, satisfy the desired probability of false watermark detection. In this embodiment, obtaining the number of erroneous symbols in each of the one or more segments includes comparing the symbols of the potential watermark frame in each of the one or more segments to one or more pre-distorted watermark templates, and producing a count for each of the one or more segments representative of a number of mismatched symbols between the symbols of the potential watermark frame in the one or more segments and the one or more pre-distorted watermark templates. Moreover, in one variation of this embodiment, a number of segments within the extrapolated watermark(s) is determined based on one or more of: an extent of the extracted tentative watermark, an amount of distortion present in the embedded host content, and/or a type of distortion present in the embedded host content. In addition, in one variation of this embodiment, the weight to a particular segment is assigned, at least in-part, based on an expected weight of an un-watermarked segment equal in length to the particular segment. According to another embodiment, an extent of each segment is determined based, at least in-part, on one or more of an amount of distortion expected to be present in the embedded host content, and a type of distortion expected to be present in the embedded host content. In another embodiment, the determining as to whether the weighted extrapolated watermark sections, when combined with the detected tentative watermark, satisfy the desired probability of false watermark detection is carried out for the one or more segments that collectively span a smaller extent than the tentative watermark.

According to another embodiment, the desired probability of false watermark detection corresponds to detection of a conclusive watermark. In yet another embodiment, the above noted method further includes reporting an estimate of amount and type of distortion, or combination of distortions, present in the embedded host content.

Another aspect of the disclosed embodiments relates to a device that includes an extractor that is configured to extract a tentative watermark from an embedded host content, where the tentative watermark represents a candidate watermark with an associated probability of false watermark detection that exceeds a desired probability of false watermark detection. The device also includes a watermark extrapolator configured to form one or more extrapolated watermarks by obtaining symbols of potential watermark frames that are positioned within the embedded host content at a predefined location relative to the extracted tentative watermark, and an evaluator configured to determine if the extrapolated watermarks, when collectively assessed with the detected tentative watermark, satisfy a desired probability of false watermark detection.

Another aspect of the disclosed embodiments relates to a device that includes a processor and a memory that includes processor executable code. The processor executable code, when executed by the processor, configures the device to extract a tentative watermark from an embedded host content, where the tentative watermark represents a candidate watermark with an associated probability of false watermark detection that exceeds a desired probability of false watermark detection. The processor executable code, when executed by the processor, also configures the device to form one or more extrapolated watermarks by obtaining symbols of potential watermark frames that are positioned within the embedded host content at a predefined location relative to the extracted tentative watermark, and determine if the extrapolated watermarks, when collectively assessed with the detected tentative watermark, satisfy a desired probability of false watermark detection.

Another aspect of the disclosed embodiments relates to a computer program product, embodied on a non-transitory computer readable medium that includes program code for extracting a tentative watermark from an embedded host content, where the tentative watermark represents a candidate watermark with an associated probability of false watermark detection that exceeds a desired probability of false watermark detection. The computer program product also includes program code for forming one or more extrapolated watermarks by obtaining symbols of potential watermark frames that are positioned within the embedded host content at a predefined location relative to the extracted tentative watermark, and program code for determining if the extrapolated watermarks, when collectively assessed with the detected tentative watermark, satisfy a desired probability of false watermark detection.

Another aspect of the disclosed embodiments relates to a method that comprises extracting a potential watermark frame from a content embedded with one or more watermarks, where each embedded watermark comprises a plurality of symbols that form a watermark frame, dividing the watermark frame into a plurality of segments, wherein each of the plurality of segments comprises two of more watermark symbols, assigning weights to each segment, combining the assigned weights associated with two or more segments to produce one or more weighted partial or full watermark frames, and determining if the one or more weighted full or partial watermark frames satisfy a desired probability of false watermark detection.

In one embodiment, an extent of each segment is selected in accordance with a type of error present in the content. In another embodiment, the weight to a particular segment is assigned, at least in-part, based on expected weight of an un-watermarked segment equal in length to the particular segment.

Another aspect of the disclosed embodiments relates to a device comprising an extractor configured to extract a potential watermark frame from a content embedded with one or more watermarks, where each embedded watermark comprises a plurality of symbols that form a watermark frame. The device also includes an evaluator that is configured to divide the watermark frame into a plurality of segments, wherein each of the plurality of segments comprises two of more watermark symbols, assign weights to each segment, combine the assigned weights associated with two or more segments to produce one or more weighted partial or full watermark frames, and to determine if the one or more weighted full or partial watermark frames satisfy a desired probability of false watermark detection.

Another aspect of the disclosed embodiments relates to a device that includes a processor and a memory that includes processor executable code. The processor executable code, when executed by the processor, configures the device to extract a potential watermark frame from a content embedded with one or more watermarks, where each embedded watermark comprises a plurality of symbols that form a watermark frame, divide the watermark frame into a plurality of segments, wherein each of the plurality of segments comprises two of more watermark symbols, assign weights to each segment, combine the assigned weights associated with two or more segments to produce one or more weighted partial or full watermark frames, and determine if the one or more weighted full or partial watermark frames satisfy a desired probability of false watermark detection.

Another aspect of the disclosed embodiments relates to a computer program product, embodied on a non-transitory computer readable medium that includes program code for extracting a potential watermark frame from a content embedded with one or more watermarks, where each embedded watermark comprises a plurality of symbols that form a watermark frame, program code for dividing the watermark frame into a plurality of segments, wherein each of the plurality of segments comprises two of more watermark symbols, program code for assigning weights to each segment, program code for combining the assigned weights associated with two or more segments to produce one or more weighted partial or full watermark frames, and program code for determining if the one or more weighted full or partial watermark frames satisfy a desired probability of false watermark detection

BRIEF DESCRIPTION OF THE DRAWINGS

FIG. 11A shows an example watermark frame with synchronization (SYNCH) and PACKET portions.

FIG. 11B illustrates example PACKET assembly attempt after successful and unsuccessful assembly of SYNCH portions of watermark frames.

FIG. 11C illustrates a PACKET assembly operation that follows the detection of a tentative watermark in accordance with an exemplary embodiment.

FIG. 11D illustrates a PACKET assembly operation that follows the detection of a tentative watermark and uses watermark segments in accordance with an exemplary embodiment.

DETAILED DESCRIPTION OF CERTAIN EMBODIMENTS

Figure 1:
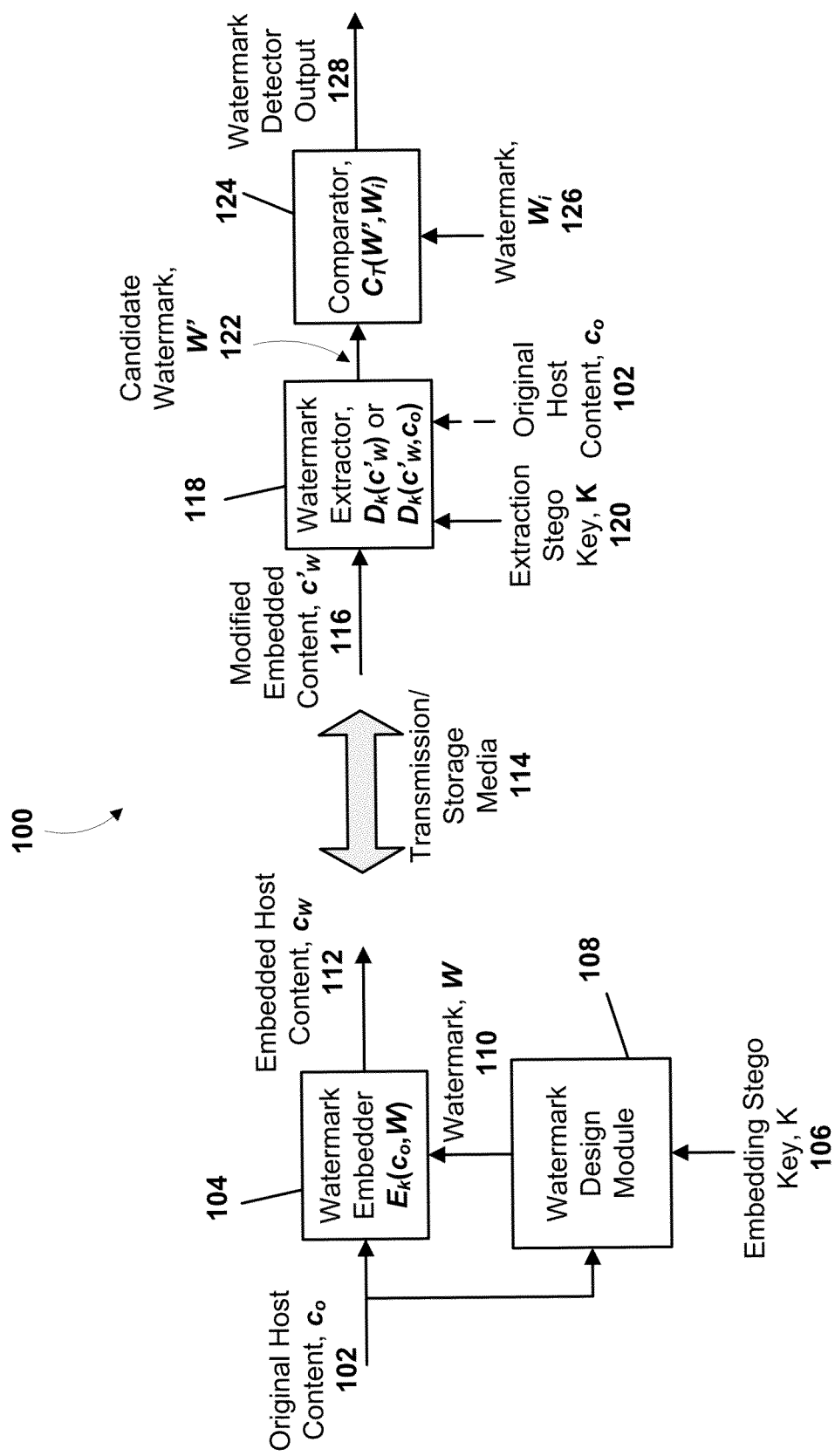
FIG. 1 is a block diagram of a watermarking system that can accommodate the disclosed embodiments.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Watermarks can be embedded into a host content using a variety of watermark embedding techniques by, for example, manipulating the least significant bits of the host signal in time or frequency domains, insertion of watermarks with an independent carrier signal using spread spectrum, phase, amplitude or frequency modulation techniques, and insertion of watermarks using a host-dependent carrier signal such as feature modulation and informed-embedding techniques. Most embedding techniques utilize psycho-visual or psycho-acoustical (or both) analysis of the host content to determine optimal locations and amplitudes for the insertion of watermarks. This analysis typically identifies the degree to which the host signal can hide or mask the embedded watermarks as perceived by humans.

An embedded host content is often stored and/or transmitted to another location using a variety of storage and/or transmission channels. These channels are characterized by inherent noise and distortions, such as errors due to scratches and fingerprints that contaminate data on optical media, noise in over-the-air broadcasts of audio-visual content, packet drops in streaming of multi-media content over the Internet or from a media server, and the like. Additional impairments that can affect fidelity of the embedded watermarks may be due to various signal processing operations that are typically performed on multimedia content such as lossy compression, scaling, rotation, analog-to-digital conversion and the like. In most digital watermarking applications, the embedded watermarks must be able to maintain their integrity under such noise and distortion conditions.

The security of embedded watermarks is another aspect of watermarking systems. In certain applications, such as proof of ownership, source authentication, piracy tracing, access control of copyrighted content, it is essential that embedded watermarks resist intentional manipulations aimed at detecting the presence of watermarks, deciphering the data carried by those watermarks, modifying or inserting illegal values (forgery), and/or removing the embedded watermarks.

Another consideration in designing a watermarking system is the watermark payload capacity. This requirement depends on the specific application of the watermarking system. Typical applications range from requiring the detection of only the presence of the watermarks (i.e., requiring single-state watermarks) to requiring a few tens of bits of auxiliary information per second. In the latter case, the embedded bits may be used to carry identification and timing information such as serial numbers and timestamps, metadata, such as captions, artist names, purchasing information, etc.

Another factor in designing practical watermarking systems is computational costs of the embedding and/or extraction units. This factor becomes increasingly important for consumer electronic devices or software utilities that must be implemented with a limited silicon real estate or computational requirements. This factor can be strongly related to the intended use of the watermarking systems. For example, watermarks for forensic tracing of piracy channels, such as those that embed different codes in each copy of content distributed over Internet, require a simple embedder and may tolerate a complex and costly forensic extractor. On the other hand, copy-control systems designed to prevent unauthorized access to multi-media content in consumer electronic devices, for example, may tolerate a sophisticated embedder but require a simple and efficient extractor.

Yet another important factor in designing a watermarking system is the probability of false watermark detections. A false watermark can be produced when a watermark is detected from an unmarked content, or may be due to the detection of a watermark value that is different from the originally embedded watermark value. The desired levels of false watermark detection can also vary depending on the intended application of the watermarking system. For example, in copy-control applications, the probability of false detections must be very low (e.g., in the order of $10^{-12}$) since executing a restrictive action (e.g., stopping the playback of the content) due to a false watermark detection on a legally purchased content is bound to frustrate users and have negative implications for device manufacturers and/or content providers. On the other hand, for broadcast monitoring applications that, for example, track the number of times that a feature song has been broadcast in order to generate a royalty payments or popularity charts, a relatively higher false detection rate (e.g., in the order of $10^{-6}$) may be tolerated since the presence of a few false detections may have very little effect on the final outcome of the counts.

Another important factor that impacts the overall performance of the watermarking system is the selection of a particular technology for watermark embedding and extraction. Making an optimum tradeoff between the above noted requirements, in view of the particular application at hand, is a very challenging task.

The disclosed embodiments significantly improve the embedding and extraction of watermarks while balancing various system requirements including, watermark transparency, robustness, false positive detection, security, payload capacity and processing load. In some embodiments, watermark extraction is based on tentative watermark detection as an intermediate step toward conclusive watermark extraction.

The following conventions may be used to facilitate the understanding of the concepts that relate to the disclosed embodiments. However, it is understood that a watermarking system that can accommodate the embodiments of the present application can be represented using other notations and representations. A watermarking system can be described by a tuple $\{O, W, K, E_K, D_K, C_T\}$, where O is a set of all original host content (i.e., one or more host contents with no embedded watermarks), W is a set of all watermarks, K is set of all stego keys, $E_K$ is an embedding operation, $D_K$ is an extraction operation and $C_T$ is a comparison operation. The embedding operation, $E_K$, and the extraction operation, $D_K$, can be represented by Equations (1) and (2), respectively.

$$E_K: O \times W \times K \rightarrow O_w \qquad (1).$$

$$D_K: O_w \times K \rightarrow W' \qquad (2).$$

In Equations (1) and (2), $O_w$ is the set of embedded content and W' is the set of candidate watermarks that are extracted from the set of embedded content, $O_w$. The comparison operation, $C_T$, which is represented by Equation (3), compares the extracted watermark, W', against the set of all watermarks, W.

$$C_T: \langle W', W \rangle \rightarrow \{0,1\} \quad (3).$$

It should be noted that in some embodiments, the comparison may be carried out not for all watermarks, but rather for a subset of all watermarks. For example, such a subset can include watermarks with a particular range of values, watermarks that are used for embedding a particular type of content, etc. Upon obtaining a successful match between W' and W, the comparison operation produces a first value (e.g., a "1") and upon an unsuccessful match comparison operation produces a second value (e.g., a "0").

FIG. 1 shows a simplified block diagram of a watermarking system 100 in accordance with an exemplary embodiment. The inputs to the watermark embedder 104 are the original host content 102, $c_o$, and the watermark 110, W. The watermark 110 is generated by the watermark design module 108 that uses the embedding stego key 106, K, and the original host content 102. The generated watermark 110 is embedded into the host content 102 to produce the embedded host content 112, $c_w$. The production of the embedded host content 112 by the embedding operation, $E_K$, can be represented by Equation (4) below.

$$c_w = E_K(c_o, W) \quad (4).$$

The embedded host content 112 is stored and/or transmitted using one or more transmission/storage media 114. The transmission/storage media 114 may be a unidirectional or a bidirectional transmission media. In embodiments that utilize a bi-directional transmission channel, information from the watermark extractors may flow back to the embedding components of the watermarking system 100. Such feedback may include, but is not limited to, transmissions of identification, authentication and/or authorization information, indications as to the success or failure of watermark extraction operations, reporting of various statistics related to the extractor operation, etc.

Referring back to FIG. 1, the content that is transmitted through the transmission/storage media 114 may include distortions that are due to inherent transmission/storage media 114 and/or are the result of intentional attacks on the embedded host content 112. Such a modified embedded host content 116, $c'_w$, is input to the watermark extractor 118, which uses an extraction stego key 120, K, and possibly the original host content 102 to produce one or more candidate watermarks 122, W'. The generation of the candidate watermarks 122 that is carried out by the extraction operation, $D_K$, can be represented by Equation (5) below.

$$W' = D_K(c'_w, c_o) \quad (5).$$

Note that many watermark detectors do not need the original host content 102 in order to extract the embedded watermarks, and therefore, in those scenarios (commonly known as blind detection), the dependence of the extraction operation, $D_K$, on the original host content 102 in Equation (5) can be dropped. It should be further noted that, in some embodiments, the embedding stego key 106 is the same as the extraction stego key 120. However, in other embodiments, the embedding stego key 106 is different from the extraction stego key 120.

The candidate watermark 122 differs in general from the watermark 110 selected for embedding either due to possible content manipulations or due to an imperfect embedding process. The candidate watermark 122 is compared to one or more possible watermarks 126, $W_i$, by the comparator 124. The comparator produces a watermark detector output 128 that is indicative as to whether or not a match between the candidate watermark 122 and one of possible watermarks 126 is produced. The watermark detector output 128 can, for example, be produced according to Equation (3). The watermark detector output 128 can further include an indication as to the value, state and/or pattern of the detected watermark. It should be noted that the comparator 124 of FIG. 1 only illustrates an exemplary mechanism for assessing whether or not a candidate watermark W' indeed represents a true watermark in the content. Other exemplary techniques for assessing the presence and/or value of a watermark include, but are not limited to, using error detection and/or error correction codes. For instance, a candidate watermark W' that is error correction code (ECC)-encoded, can be decoded to ascertain whether or not an error-free watermark packet can be recovered and/or to obtain the number of errors that contaminate a particular watermark packet.

The watermark detector output 128 is generated in view of a desired probability of false watermark extractions, $P_f$. False watermark detections may occur in two different ways. First, for any watermark extraction system, there is a small, but finite, probability of falsely detecting a watermark in an un-watermarked content (also sometimes refereed to as a false positive detection). Secure digital music initiative (SDMI) and DVD-audio requirements, for example, specify a false positive watermark detection probability of less than $10^{-12}$ per 15-second detection interval. This means that the average time between false positive watermark detections must be 476 thousand years of continuous monitoring of un-watermarked content. A second type of false detection occurs when a watermarked content is being examined and a watermark value is detected that is different from the originally embedded watermark value. This type of false detection, normally called a misdetection, can produce unwanted outcomes. For example, a misdetection can potentially result in the detection of a "no playback allowed" watermark instead of a "no copy allowed" watermark and, therefore, cause the playback of a legitimately purchased content to be halted. For a properly designed watermarking system, the rate of misdetections should be roughly the same order of magnitude as the rate of false positive detections described above.

In some systems, a threshold, T, is used to determine the output of the comparison operation that is represented by Equation (3). That is, the comparator output can be represented by Equation (6) below.

$$C_T(W', W) = \begin{cases} 1, & m > T \\ 0, & m \leq T. \end{cases} \quad (6)$$

In Equation (6), m is the comparison result (and/or a correlation value) such that the probability of false watermark detection, $P_f$, monotonically decreases as m increases.

The comparator operation and computation of false watermark detection probability depend on the selected watermarking algorithm. For example, many spread spectrum-based watermarking algorithms use the correlation measure between W' and W as the comparison measure, m. In particular, the correlation coefficient, m, between the candidate watermark, W', and the pseudo-random pattern that is used in embedding a watermark, W, is estimated. Next if the estimated correlation coefficient, m, is greater than a particular threshold, T, a successful watermark extraction is reported. In the case of unmarked content, the correlation coefficient calculated between the extracted false watermark pattern and the long pseudo-random pattern follows approximately a normal distribution, which means the probability of false watermark detection, $P_f$, can be calculated using the well-known error function. As the correlation coefficient, m, increases, the probability of false watermark detection, $P_f$, monotonically decreases. Therefore, the threshold, T, has one-to-one mapping with $P_f$.

Alternatively, candidate watermarks can also be extracted as a string of bits and then the number of bit errors, e, can be calculated using error detection/correction codes or direct pattern matching to bit patterns of potential watermarks. The probability of false watermark detection, $P_f$, can then be calculated using Binomial distribution. For example, if the watermark is N bits long and the number of bit errors is less than or equal to e, then the probability of false detections can be computed using Equation (7).

$$P_f(N, e) = 2^{-N} \sum_{j=0}^{e} \binom{N}{j}. \quad (7)$$

If the watermark consists of N=64 bits, and detector finds only e=5 bit errors, then the probability of false watermark detection, $P_f$, is less than $10^{-12}$. This $P_f$ condition is typically sufficient for conclusive watermark extraction and, for example, outright copyright enforcement. The probability of false watermark detection, $P_f$, that is obtained from Equation (7) monotonically decreases as the number of bits that match, m (i.e., N−e), increases.

The above described comparison operations produce only two results. In a first outcome, the watermark is extracted and reported, e.g., to enforce a copyright rule. This outcome is sometimes referred to as the detection of a strong watermark. In a second outcome, the watermark is not found and no further action is commenced. In addition to the aforementioned conclusive watermark detections and no detection of watermarks, a third outcome of the comparison process can be established that designates the detection of a "tentative" watermark. For example, the third outcome can designate extraction scenarios where the comparison produces a value (e.g., number of bits with error, e) that is greater than or equal to the threshold, T, for a strong watermark detection but less than another threshold, t. The three outputs of the comparison operation may be represented by Equation (8) below.

$$C_{T,t}(w', w) = \begin{cases} 1, & e < T \\ 0.5, & T \leq e < t \\ 0, & e \geq t. \end{cases} \quad (8)$$

Let us consider again the case where the watermark consists of a string of bits and the comparator output count consists of the number of bit errors. In the above example, finding up to 5 errors in the 64-bit long string may be sufficient for a conclusive watermark extraction. However, if detector finds 20 bit errors, the probability of false watermark detection is less than 0.2%, which makes the watermark presence likely, but not certain enough to warrant its use outside of the extractor. Therefore, any error count more than 5 (i.e., T=6) but less than 21 (i.e., t=21) can be used to signal a tentative watermark detection. If the error count is greater than or equal to 21 errors, then the probability of false watermark detection is greater than 0.2% and, therefore, the watermark may be ignored.

Figure 2:
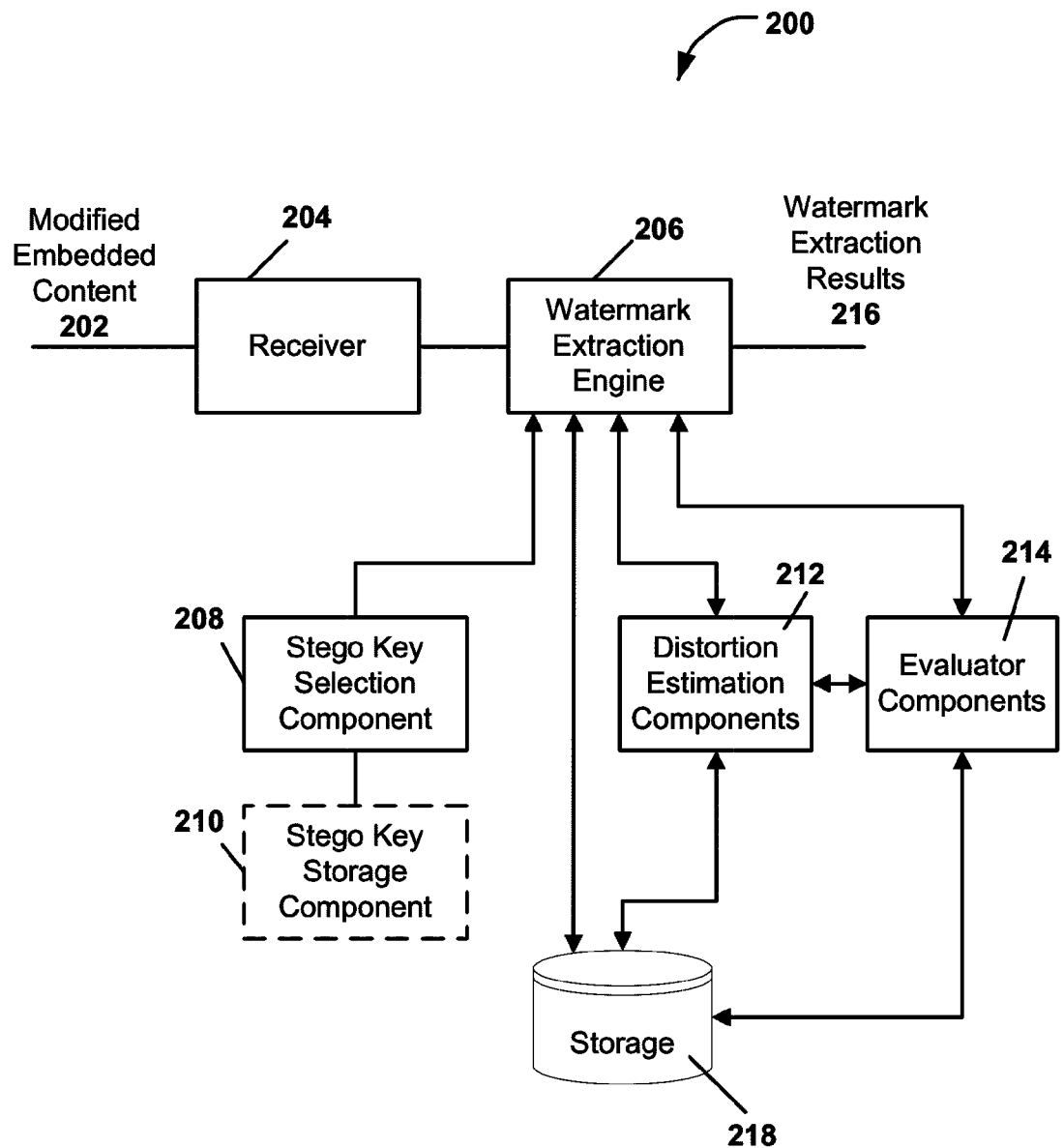
FIG. 2 is a block diagram of a watermark extractor device that can accommodate the disclosed embodiments.

FIG. 2 shows a simplified block diagram of a watermark extractor device 200 that can accommodate the disclosed embodiments. The watermark extractor device 200 may be a stand-alone device or may be incorporated as a component of a larger content handling device, such as a content playback device, a content relay device, a content recording device, a set top box, and the like. The incoming modified embedded content 202 is received at a receiver 204. The receiver 204 is depicted in FIG. 2 as being a separate component within the watermark extractor device 200. However, it is understood that the receiver 204 may be a component within a different subsystem of a larger media handling device, or may be incorporated as part of one another component within the watermark extractor device 200. As the modified embedded content 202 may be in a variety of formats and may comprise several audio, video, multimedia, or data signals, it may be necessary for the receiver 204 to appropriately condition the modified embedded content 202 into the proper form that is recognizable by other components of the watermark extractor device 200. The conditioning may comprise signal processing operations, such as demodulation, decompression, de-interleaving, decryption, descrambling, re-sampling, A/D conversion, reformatting, filtering, and the like.

A stego key selection component 208 then selects at least one stego key from a collection of stego keys that are used by the watermark extraction engine 206 to extract the embedded watermarks. In some embodiments, the stego keys are stored in a stego key storage component 210. Watermark extraction results 216 are produced by the watermark extraction engine 206. The watermark extraction results 216 can indicate the presence and/or value of the recovered watermark(s), as well as indications of reliability of the recovered watermarks and other information. The watermark extraction results 216 may be reported (e.g., to a particular user or device) at pre-determined time intervals. In some embodiments, distortion estimation components 212 produce estimations of type and amount of one or more distortions that may be present in the received content. The estimated distortion information can be used by the watermark extraction engine 206 to facilitate the detection of embedded watermarks in the presence of content distortions. Estimated distortion information can also be communicated to evaluator components 214 that facilitate the detection of embedded watermarks by evaluating watermark frames that are being processed by the watermark extraction engine 206. In some embodiments, the evaluator components 214 can perform operations such as assigning weights to extracted potential watermarks or watermark segments, combining the assigned weights, evaluating if the extracted watermarks, or accumulated watermark segments satisfy a desired probability of false watermark detection, and the like. In some embodiments, the watermark extraction results 216 can be outputted by the evaluator components 214 rather than the watermark extraction engine 206. The distortion estimation components 212, the evaluator components 214 and the watermark extraction engine 206 can be in communication with storage 218 (e.g., a database) that contains pre-distorted watermark templates and other information. Pre-distorted watermark templates will be discussed in detail in the sections that follow. The storage 218 may be the same or different physical storage unit as the stego key storage components 210. It should be noted that to facilitate the understanding of underlying concepts, FIG. 2 illustrates separate components within the watermark extractor device 200. However, it is understood that in some implementations, two or more of the depicted components may be combined together. For example, in some implementations, one or more of the distortion estimation components 212, the evaluator components 214 and the storage 218 may be incorporated as part of the watermark extraction engine 206.

In some applications, if the watermark extraction results 216 are indicative of detection of at least one conclusive watermark, further enforcement actions (such as stoppage of content playback, stoppage of content recording, display of a warning message, etc.) can be carried out outside the watermark extractor device 200. If the watermark extraction results 216 are indicative of detection of at least one tentative watermark, the usage of the extracted tentative watermarks can be limited to within the watermark extractor device 200 to, for example, initiate various adjustments to the detector operation. As noted earlier, a tentative watermark can be detected based on a threshold, which depends on the tentative watermark usage, as well as on the desired tradeoffs between processing load and robustness gains.

Many intentional attacks on digital watermarks, or even regular content processing operations, result in watermark distortions that change the watermark position, size, orientation and other parameters. For example, camcordering of a movie that is being displayed on a screen may result in picture rotation, cropping in time or space domains, picture stretching, perspective modification, etc. Similarly, audio watermarks may be exposed to time shifts (e.g. due to audio cropping or concatenating with other audio), time scaling, pitch shifts, wow and flutter, etc. Most of those distortions can be compensated by detecting and inverting the content distortion prior to watermark extraction. Alternatively, in some embodiments, the effects of such distortions may be fully or partially mitigated by adjusting the watermark search process to correlate extracted candidate watermarks to the pre-distorted watermark templates.

The distortion detection and compensation can be manual or automatic, and it can be achieved with or without the original content at the detector. Clearly, the most desirable approach is to provide automatic distortion detection without using the original content in order to simplify the watermark detection process. Typically this can be achieved by introducing synchronization (or registration) watermarks.

Figure 3A:
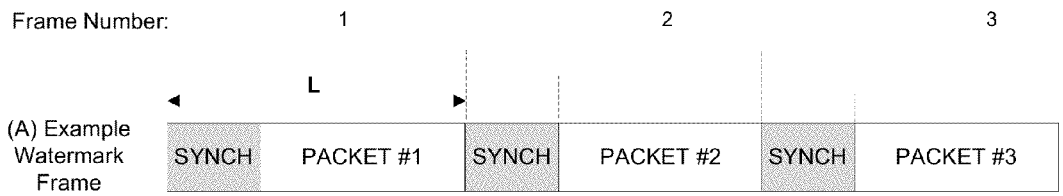
FIG. 3A shows an example watermark frame with synchronization (SYNCH) and PACKET portions.

FIG. 3A shows an example watermark frame of length L that includes a synchronization portion (SYNCH) and packets portion (PACKET). In the exemplary diagram of FIG. 3A, for simplicity, a one-dimensional view of a watermark frame (e.g., corresponding to an audio content) is depicted. It is, however, understood that similar principles are applicable to watermarks have two or more dimensions (such as watermarks that are embedded in images, video sequences, and the like). The synchronization and packet portions of a watermark frame each can comprise a plurality of symbols (i.e., binary or non-binary symbols). In some embodiments, the synchronization portion of a watermark frame can be a particular pattern or sequence that is embedded in a host content. As such, the synchronization portion of a watermark frame is sometime referred to as a synchronization watermark, a synchronization pattern, a synchronization marker, a synchronization sequence and the like. One of the functions of the synchronization portion is to assist in locating a watermark frame within a host content. For example, a watermark extractor may search a content (e.g., process the samples of a content) to find a known synchronization pattern that marks the beginning of a watermark frame. Upon successful detection of the synchronization portion, the watermark extractor may then attempt recovering the watermark packet symbols that follow the synchronization portion. In some embodiments, detection of a synchronization pattern signals the start of a watermark frame with coarse granularity, which can further trigger additional processing at fine granularity to increase the reliability of watermark detection. In some systems, a watermark frame may contain two or more synchronization portions that are used to, for example, establish the location of a watermark frame with different levels of granularity, and/or to signal the beginning, end and/or other sections of a watermark frame.

Figure 3B:
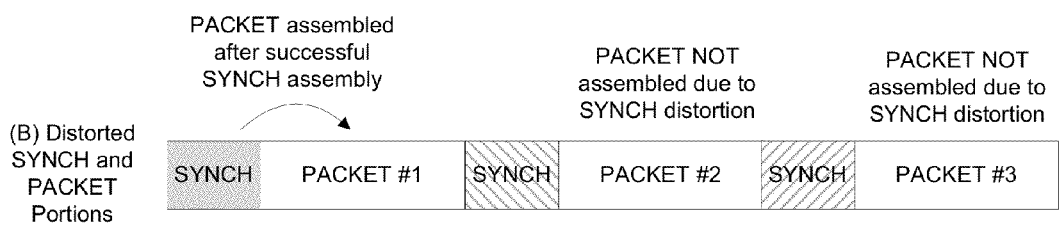
FIG. 3B illustrates example PACKET assembly attempts after successful and unsuccessful assembly of SYNCH portions of watermark frames.

In an example extraction operation workflow, following a successful assembly and detection of the SYNCH, the PACKET is assembled. However, when significant amount of distortion is present in the content, it may be hard or impossible to detect the SYNCH. FIG. 3B shows that PACKET #1 is assembled after successful detection of the SYNCH portion that marks the beginning of PACKET #1. However, PACKETS #2 and #3 are not assembled due to distortion to the SYNCH portion that precedes each of the PACKETS #2 and #3. To further illustrate the extraction of watermarks, let us consider an application where an audio content is embedded with watermarks and is subsequently linearly compressed in time (e.g., with associated pitch shift up) due to an intentional or unintentional content processing operation. Depending on the particular watermark embedding technology, the SYNCH portions of the embedded watermark frames may be able to tolerate certain amount of time scaling before their detection fails. In some scenarios that the content has been subjected to linear time scaling, if the amount of time scaling can be estimated, the immunity to time scaling can be improved by scaling the content in the opposite direction before attempting to extract the SYNCH patterns. This way, the audio time-scale compression is inverted (i.e., compensated) and the watermark detection becomes feasible for a larger range of compression impairments.

In another embodiment, instead of modifying the time-scaled (or otherwise impaired) content, one or more pre-distorted synchronization templates (e.g., time-compressed synchronization templates) are generated and used to detect the embedded synchronization patterns without changing the content itself. As noted earlier, SYNCH patterns are used to establish the location of the watermark frames. SYNCH templates are pre-defined SYNCH patterns that are formed to facilitate the detection of a SYNCH pattern that is embedded in a content. According to some embodiments, the SYNCH detection process includes processing the received content to obtain a candidate SYNCH pattern and then comparing the candidate SYNCH pattern to one or more SYNCH templates that can include a plurality of pre-distorted SYNCH templates. Analytical and empirical results indicate that generating a set of pre-distorted SYNCH templates provides as much reliability of watermark detection as scaling the content, but at a lower processing cost.

In order to facilitate the understanding of the disclosed embodiment, it is instructive to consider an example where a SYNCH pattern comprises a sequence of 50 bits that are embedded in sequential sections of an audio content using a particular embedding algorithm. Let us further assume that each bit of the SYNCH pattern spans 1 second of the host audio content. For an audio content with 44,100 samples per second, each bit of the SYNCH pattern is embedded over 44,100 samples of the content. One method of detecting the SYNCH pattern from a received content is to (1) collect 44,100 samples of the received content, (2) process the samples to extract a candidate bit value, (3) repeat steps (1) and (2) 49 times to form a 50-bit candidate SYNCH pattern and (4) compare the candidate SYNCH pattern to one or more SYNCH templates to ascertain if the candidate SYNCH pattern indeed corresponds to a true SYNCH pattern with a particular confidence level.

Since the location of a SYNCH pattern within a content is not known, steps (1) through (4) may need to be repeated in a sliding-window fashion, where in each iteration of steps (1) through (4) the processed samples of the received audio content overlap with the previous iteration. In an extreme case, steps (1) through (4) can be repeated 44,100 times to produce a pool of 44,100 candidate SYNCH patterns with a one-sample search granularity. In most practical applications, however, such an extreme approach is neither computationally feasible, nor necessary for detecting embedded SYNCH patterns with reasonable reliability. Therefore, steps (1) through (4) are often repeated a few times for each watermark bit duration. This is sometimes referred as searching the content with X sub-bit granularity, where X represents the number of times steps (1) through (4)—or at least steps (1) and (2)—are repeated for each bit duration. In some embodiments, the detection process may start with a coarse sub-bit granularity (e.g., 3 sub-bits) and, once a potential SYNCH pattern is detected, the search is repeated or resumed at a higher sub-bit granularity.

Figure 17:
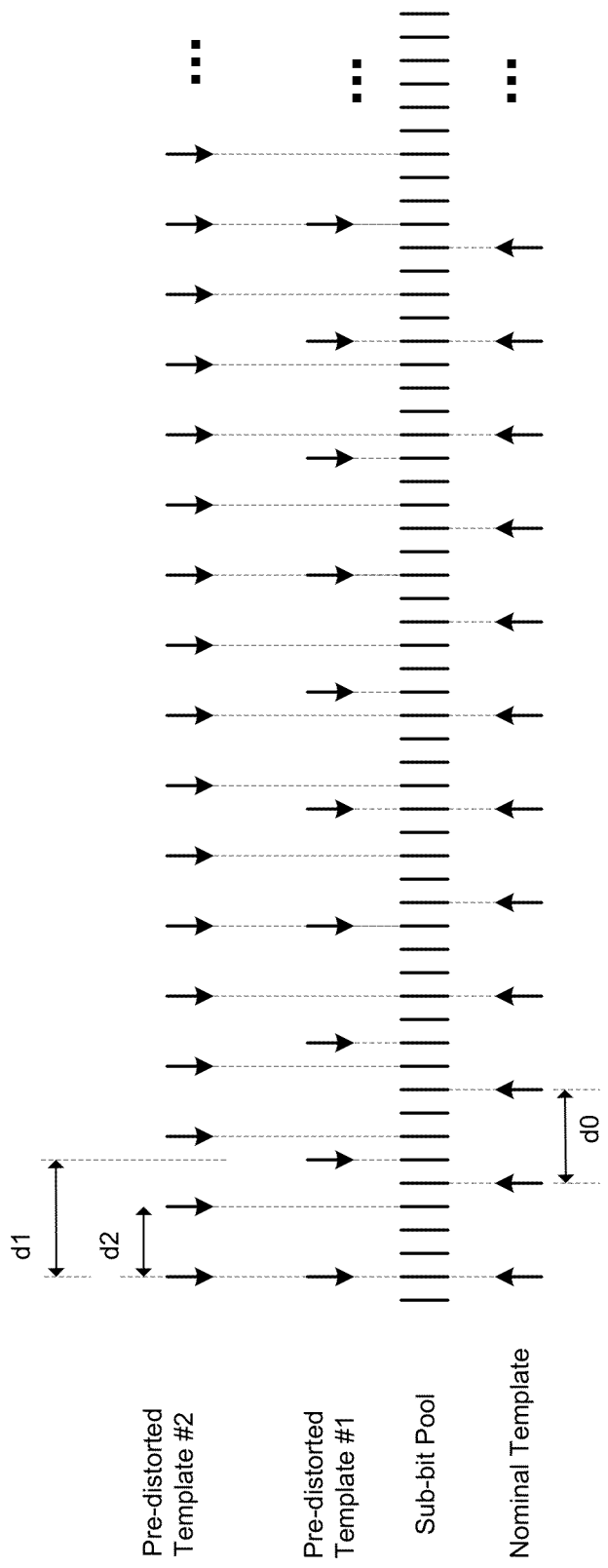
FIG. 17 illustrates SYNCH assembly and pre-distorted SYNCH template operations in accordance with exemplary embodiments.

In the absence of content distortions, the above noted SYNCH detection procedure can be carried out by assembling candidate SYNCH pattern bit values that are spaced apart at a nominal distance from one another. FIG. 17 is a simplified diagram of SYNCH assembly and/or template generation that can be carried out in accordance with an exemplary embodiment. The sub-bit pool, as noted earlier, represents candidate bit values that are produced at sub-bit granularity. The nominal template selection operation in the exemplary diagram of FIG. 17 includes selecting every fifth sub-bit (or more generally sub-bits that are d0 apart). In the above example, where the SYNCH pattern is a 50-bit sequence, 50 such sub-bits are selected to form a candidate SYNCH pattern. The candidate SYNCH pattern is then compared to a nominal (or undistorted) SYNCH template to determine how well they match (e.g., how many mis-matched bits are detected).

In the presence of a distortion, such as a time scaling distortion, candidate SYNCH patterns may be formed by selecting sub-bits at a spacing that differs from the nominal spacing. Referring to FIG. 17, the sub-bits may be selected at a distance d1 for a first type of distortion (e.g., time expansion), and at a distance d2 for a second type of distortion (e.g., time contraction). In some scenarios, the candidate SYNCH patterns that are obtained based on different sub-bit spacings are compared to the nominal SYNCH template to assess how well they match.

In some embodiments, instead of matching the candidate SYNCH patterns to the nominal SYNCH template, the candidate SYNCH patterns are compared to one or more pre-distorted SYNCH templates that can differ from the nominal SYNCH template. Such pre-distorted SYNCH templates can be obtained by embedding a content (or a variety of contents) with a SYNCH pattern, subjecting the content(s) to various distortions, and extracting the SYNCH patterns from the distorted content at nominal and/or modified sub-bit spacing. For example, with reference to FIG. 17, pre-distorted template #1 of length N (e.g., N=50) may be obtained by selecting N sub-bits with d1 spacing, whereas pre-distorted template #2 of length N may be obtained by selecting N sub-bits with d2 spacing. The selection of pre-distorted templates based on different sub-bit spacing is most effective for scaling-type distortions. For some distortions (e.g., acoustic propagation, intensity/amplitude modulation, camcorder capture, etc.), the pre-distorted templates can be obtained by selecting the sub-bits at the nominal spacing, d0.

Figure 4:
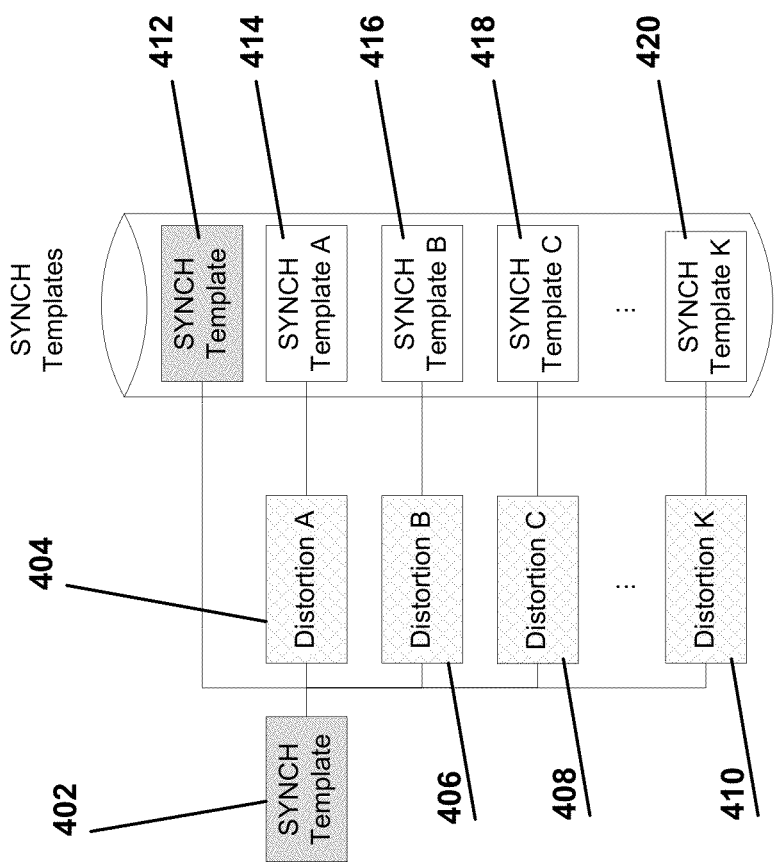
FIG. 4 shows pre-distorted SYNCH templates in accordance with an exemplary embodiment.

Generally, many dimensions of distortion space can be explored using pre-distorted SYNCH templates. FIG. 4 shows an example where an original (or nominal) SYNCH template 402 (i.e., the SYNCH template in the absence of content distortions) is passed through various potential distortions A through K 404, 406, 408, 410 to generate a set of pre-distorted SYNCH templates A through K 414, 416, 418, 420. FIG. 4 also depicts the undistorted SYNCH template 412 which may be stored along with the pre-distorted SYNCH templates A through K 414, 416, 418, 420. Pre-distortion of templates is applicable to contents that are modified in one or more dimensions in frequency/time/space/amplitude domains, including linear or nonlinear scaling (warping) and rotation. A non-exhaustive list of distortions that may affect watermarks that are inserted into images include image rotation, stretching in vertical or horizontal dimensions, dynamic range compression of luminance signal, color balance, etc. A non-exhaustive list of impairments that may affect watermarks that are inserted into audio content includes linear time scaling, pitch-invariant time scaling, time-invariant pitch scaling, dynamic range compression, equalization and re-sampling.

It should be noted that the above discussion regarding SYNCH patterns can be readily expanded to include watermark packets. Moreover, the disclosed principles can extended to include SYNCH or PACKETS that are embedded in two or more dimensions, in spatial, temporal and/or frequency domains. Such SYNCH or PACKETS may be represented by binary or non-binary symbols, and their detection may be based on binary or non-binary symbols and/or parameters. For example, the SYNCH portion of an embedded watermark may be generally described as a predefined signal pattern which can be extracted using a correlation process.

Figure 3C:
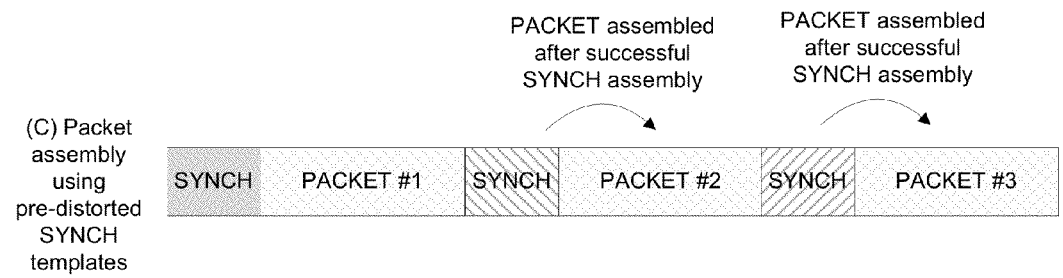
FIG. 3C illustrates PACKET assembly operations using pre-distorted SYNCH templates in accordance with an exemplary embodiment.

FIG. 3C illustrates similar PACKET assembly operations for the same packet that was shown in FIG. 3B, but the operation in FIG. 3C utilizes pre-distorted SYNCH templates to enable successful detection of the embedded SYNCH in the presence of content distortion. The amount of processing and the probability of false watermark detections depend on the number of pre-distorted templates, K, that are used for detecting the embedded synchronization patterns. The number of pre-distorted templates, K, depends on the range and granularity of distortions that need to be accommodated, as well as to the watermark technology sensitivity to particular distortions. For example, spread spectrum-based watermark technologies are generally more sensitive to time scaling distortions than technologies that are based on replica modulation. Therefore, spread spectrum-based technologies require many more pre-distorted templates to effectively detect watermarks in the presence of time-scaling distortions when compared to replica modulation techniques.

Consider a scenario where an audio watermark is distorted using time-invariant pitch scale (TIPS) modification. Let us further assume that pre-distorted watermark templates only accounted for the following TIPS modification values: 3%, 6% and 9%. In such a case, the watermark extractor can only reliably detect and report watermarks as either tentative or conclusive from a content that has been distorted with about 3%, 6% or 9% TIPS impairment (plus and minus a tolerance value). In this example scenario, when the audio watermark is distorted at any other TIPS rate (e.g., 4.5%), there is a possibility that conclusive watermarks are not detected. It is clear that the selection of the number of pre-distorted templates depends significantly on the desired reliability of SYNCH detection. As the granularity of pre-distorted templates increases, the chances of detecting a reliable SYNCH (e.g., with low bit-error count or high correlation coefficient value) also increases, but so does the processing load. Therefore, it is important to provide a tradeoff between the number of pre-distorted synchronization templates and the probability of false watermark detections.

In some embodiments, the granularity of pre-distorted synchronization templates within a particular distortion range (and, therefore, the number of pre-distorted templates) is selected such that at least a single tentative watermark is detected in the distorted content. For example, the number and spacing of pre-distorted synchronization templates are selected in such a way that even if the distortion is mid-way between two pre-distorted templates (as in the example above), there is a good chance that SYNCH patterns are detected, followed by the detection of a tentative watermark.

Figure 5:
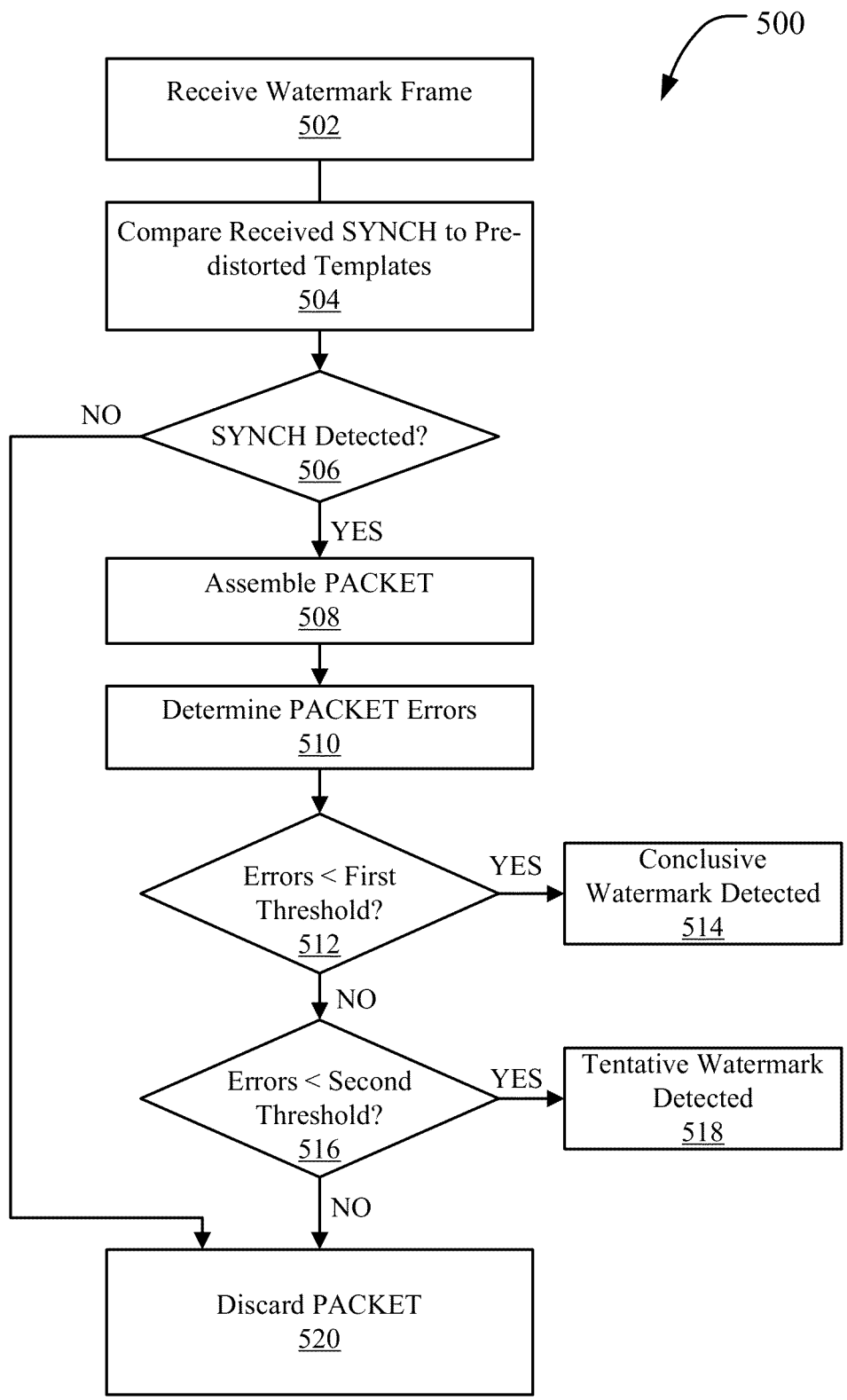
FIG. 5 illustrates a set of operations that are carried out in accordance with an exemplary embodiment.

Once a tentative watermark is found, the extractor can commence more elaborate searches of the distortion space. FIG. 5 illustrates a set of operations 500 that are carried out in accordance with an example embodiment. At 502, a watermark frame is received. The received frame can include synchronization (SYNCH) and watermark packet (PACKET). At 504, the received SYNCH is compared to a plurality of pre-distorted SYNCH templates. At 506, it is determined if a SYNCH has been successfully detected, and if so (i.e., "YES" at 506), the set of operations 500 continues at 508 to assemble the PACKET. If, on the other hand, the determination at 506 is not indicative of a successful SYNCH detection (i.e., "NO" at 506), the set of operations 500 continues at 520, where the PACKET is discarded.

Referring back to FIG. 5, at 508, PACKET assembly may include a variety of operations, such as de-interleaving, descrambling, and other packet formation operations. At 510, the number of errors in the assembled PACKET is determined. The operations at 510 can include, for example, decoding using error correction/detection codes, template matching, and the like. At 512, it is determined if the number of errors in the assembled PACKET are less than a first threshold associated with the detection of a strong (i.e., conclusive) watermark, and if so (i.e., "YES" at 512), the detection of a conclusive watermark is declared at 514. If the determination at 512 indicates an error value that is greater than a first threshold (i.e., "NO" at 512), the set of operations 500 continues at 516, where it is determined if the number of errors in the assembled PACKET are less than a second threshold associated with the detection of a tentative watermark. If the determination at 516 is a "YES," the set of operations 500 continues at 518 where the detection of a tentative watermark is declared. If, on the other hand, the indication at 516 is a "NO," the set of operations 500 continues at 520 and the PACKET is discarded.

Figure 6:
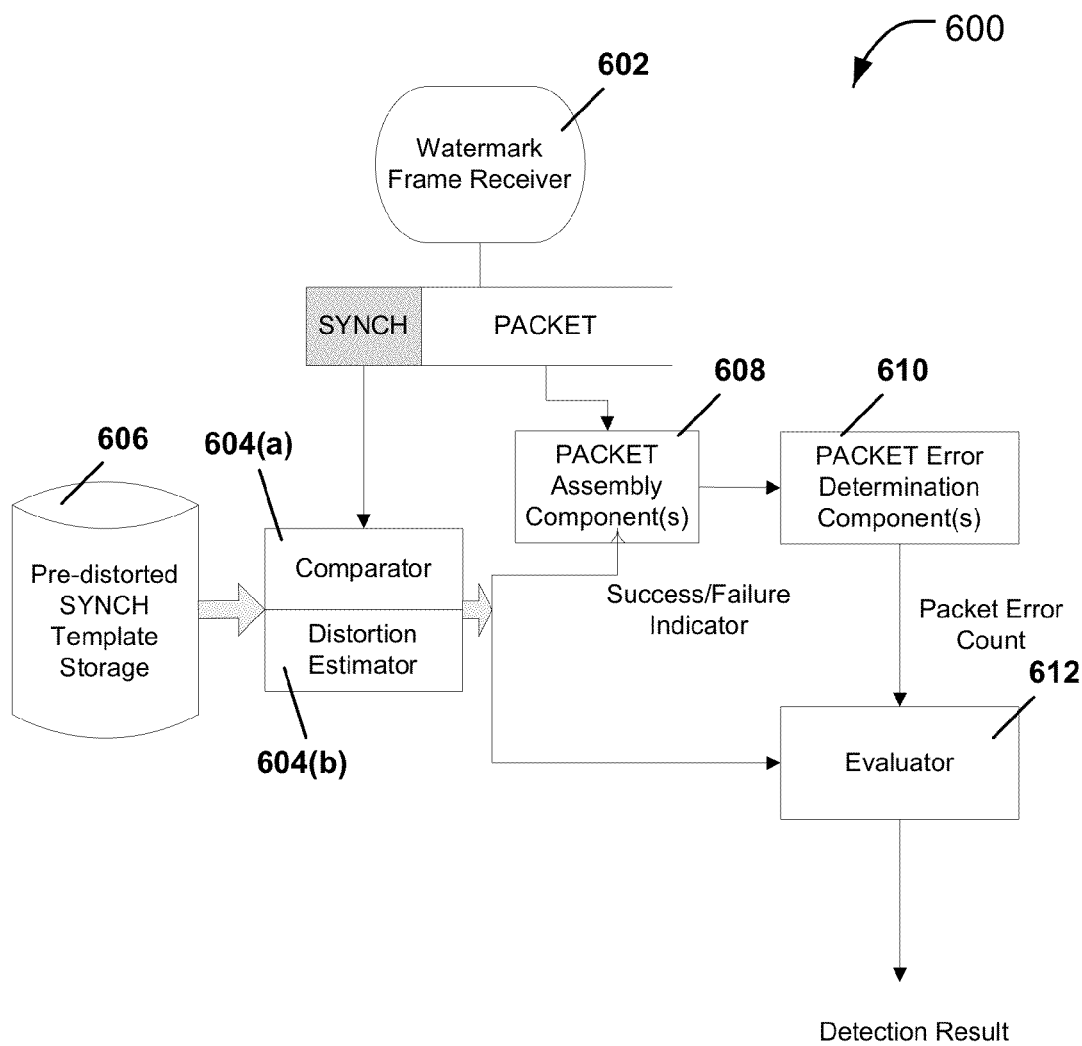
FIG. 6 is a block diagram of certain components that can be used to carry out some or all of the operations of FIG. 5 in accordance with an exemplary embodiment.

FIG. 6 is a simplified diagram that illustrates the components 600 that can be used to carry out some or all of the operations that are described in FIG. 5. The watermark frame receiver 602 is configured to receive a watermark frame including the SYNCH and PACKET portions of the watermark frame. The comparator 604(a) is configured to receive the SYNCH and compare it to one or more of the pre-distorted synchronization templates, as well as the undistorted SYNCH template. The result of the comparison can be used by the distortion estimator 604(b) to obtain an estimation of one or more distortions that are present in the content. The distortion estimator can, for example, identify the pre-distorted synchronization template that produces the best match with the received SYNCH, and select one or more distortion types and/or distortion amounts associated with the identified pre-distorted SYNCH template to represent the distortion(s) present in the content. In some embodiments, the comparator 604(a) and the distortion estimator 604(b) are combined into a single component (e.g., the comparator 604(a)).

The templates can be stored in a storage 606 component. The PACKET assembly component(s) 608 are configured to receive at least the PACKET and an indication as to the success or failure of the comparator 604(a) in obtaining a match between the received SYNCH and one or more of the pre-distorted synchronization templates, or the undistorted SYNCH template. Upon the detection of a successful SYNCH, the PACKET assembly component 608 assembles the PACKET of the watermark frame, which is used by the PACKET error determination component(s) 610 to produce an error count. The produced error count is used by the evaluator 612 comprising decision logic component(s) to determine if the error count is confined within, or is above or below a particular packet error range. The evaluator 612 can, for example, determine (and provide an output that indicates) if a conclusive or a tentative watermark is detected. The evaluator 612 can also produce an indication that the PACKET is to be discarded due to failure of the comparator 604(a) and/or distortion estimator 604(b) to detect a SYNCH match, or when neither a tentative nor a conclusive watermark is detected. The output of the evaluator 612 can be used to trigger additional operations, such as triggering an expanded packet search when a tentative watermark is detected. The output of the evaluator 612 can include additional information such as a watermark value (i.e., detected watermark state, watermark pattern, etc.), indications of the level of confidence in such watermark detections (e.g., the packet error count, the synch error count, etc.), the amount and type of one or more distortions that are present in the content, and the like The multi-step approach that is described in connection with FIGS. 5 and 6 enables efficient balancing of the overall processing load in a watermark extractor and the associated probability of false positive watermark detection, and further improves the overall robustness and security of watermark extraction.

In some embodiments, the two step search of the distortion space can be implemented in such a way that a match between a pre-distorted SYNCH template and the detected candidate SYNCH pattern immediately triggers expanded extractor operation, such as expanding the location and granularity of the search for synchronization patterns and/or watermark packets. However, such an immediate expansion of extractor operations may not produce an optimum tradeoff in terms of processing load and probability of false positive watermark detections. For example, let us assume that we want to improve the conclusive watermark extraction performance over −20% to +20% pitch invariant time scaling (PITS) distortion range. We have to carefully choose the granularity of search in order to properly populate the pre-distorted SYNCH template database 606. If a fine search granularity is selected, e.g., with 1% PITS spacing, then a large number of pre-distorted templates (e.g., 40 pre-distorted SYNCH templates and one undistorted SYNCH template) may have to be utilized in order to reliably detect the SYNCH patterns. In this scenario, the large number of pre-distorted SYNCH templates can negatively affect the processing load and probability of false watermark detections. Moreover, if pre-distorted template matching has a high probability of false SYNCH detections, each SYNCH detection can trigger an expanded extractor operation, which would increase the processing load and the probability of false watermark detections. On the other hand, if a coarse search granularity is selected, e.g., with 5% PITS spacing, then there is a potential that the embedded SYNCHs, as well as the corresponding watermark PACK- ETS, are not detected. Further, if pre-distorted template matching has a probability of false SYNCH detection that is too low, then many watermarks in the distorted content may fail to be detected. Such a shortcoming may, however, be compensated by increasing the number of pre-distorted templates at the expense of additional processing load. It is, therefore, advantageous to generate a finite number of pre-distorted synchronization templates and utilize them in a watermark extractor in a way that improves the balancing of true watermark detections, processing load and probability of false watermark detections.

Figure 7:
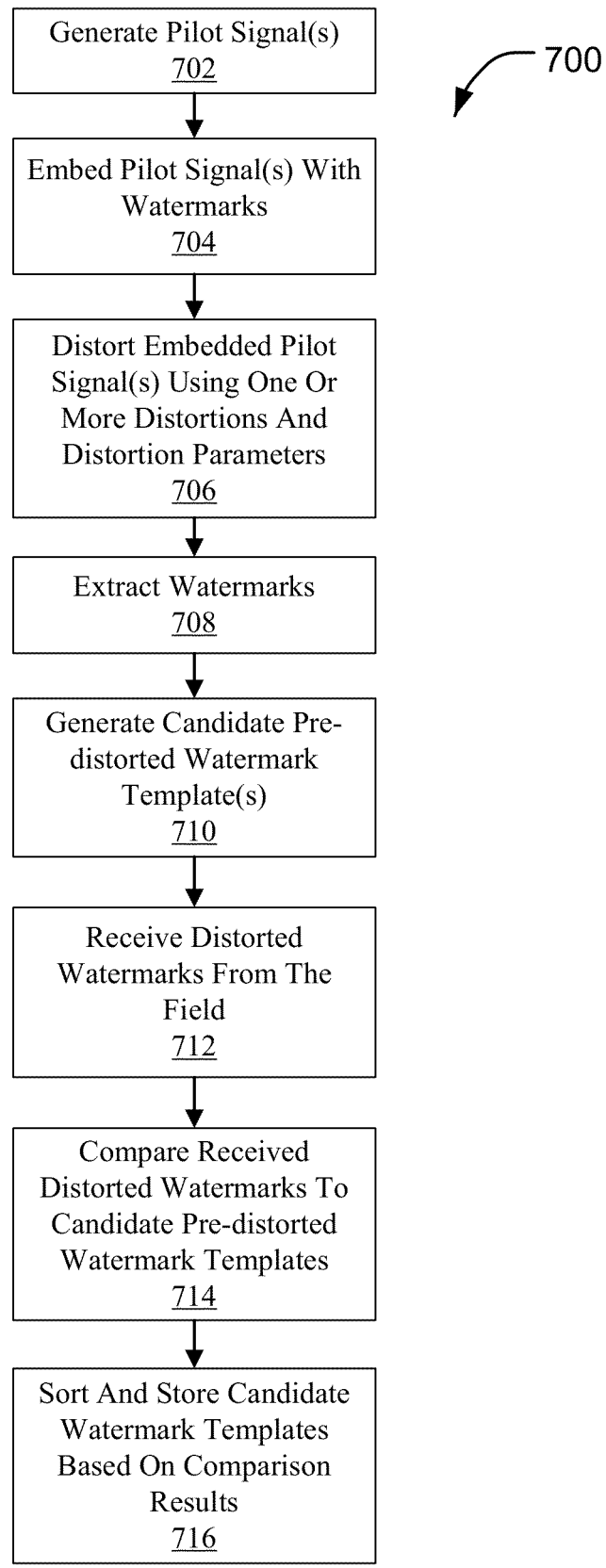
FIG. 7 illustrates a set of operations that can be carried out to generate a set of pre-distorted watermark templates in accordance with an exemplary embodiment.

FIG. 7 illustrates a set of operations 700 that can be carried out to generate a set of pre-distorted watermark templates in accordance with an exemplary embodiment. It should be noted that in describing the set of operations 700 in FIG. 7, references are made to pre-distorted watermark templates. However, it is understood that such templates can be generated for one or both of a synchronization pattern and a known watermark packet pattern. For example, a watermark with a two-bit payload can only signal the presence of one of four different states. In such a system, a unique symbol pattern can be associated with each of the watermark states, and for each unique symbol pattern, the set of operations 700 that are described in connection with FIG. 7 can be carried out.

Referring to FIG. 7, at 702, one or more pilot signals are generated. These signals may correspond to specific functions such as impulses, sinusoidal functions, square waves, flat images, edge images, and the like. It should be noted that the term "signal" is used to convey a specific type of content that may be transmitted, received and stored in digital or analog form. Such signals can be subject to signal processing operations such as modulation/demodulation, A/D and D/A conversions, compression, re-sampling and the like. The pilot signals that are generated (or otherwise obtained) at 702, once embedded with synchronization patterns and/or watermark packets and distorted (or transmitted through a noisy channel), can provide insights as to the characteristics of the distortion and the transmission channel, as well as how such distortions and/or transmissions affect the embedded watermarks. In an alternate embodiment, instead of a pilot signal, a typical content (e.g., a concatenation of different types of movies) is additionally, or alternatively, generated or obtained at 702.

At 704, the pilot signals are embedded with watermarks. At 704 the embedded pilot signals undergo one or more distortions. These distortions can include, but are not limited to, various time scaling distortions, A/D and D/A distortions, cropping, rotation, scaling, spatial and/or temporal shifts and the like. The distortions can be applied to the host pilot signals at 706 using one or more distortion parameters that can span a particular range. For example, a linear time-scaling (LTS) distortion can be applied in accordance with an LTS percentage parameter that ranges between −10% to +10% at 1% increments. At 708, watermarks are extracted from the distorted pilot signals. At 710, for each successful watermark extraction, a pre-distorted candidate watermark template is generated that corresponds to a particular distortion with a particular distortion parameter. At 712, a set of distorted watermarks are received from the field. In one example, the set of distorted watermarks at 712 are produced by extracting watermarks from the host pilot signals subsequent to watermark embedding at 704, after the host pilot signals have undergone a real-world transmission through a noisy channel. For instance, the host pilot signals that contain embedded watermarks can be played back in a movie theatre, captured using a camcorder, and input to watermark extractor to obtain the distorted watermarks.

At 714, the received distorted watermarks are compared against the candidate pre-distorted watermark templates. This comparison can reveal which of the candidate pre-distorted watermark templates are of best match or relevance. At 716, the relevant pre-distorted watermark templates are sorted (e.g., in the order of relevance or best match) and stored in a database. In some embodiments, the database may include a subset of the pre-distorted watermark templates that produced either a tentative watermark or a strong watermark. Note that the pre-distorted template database can be updated and/or supplemented with new templates when a new distorted watermark from the field is obtained.

The process of experimental selection of pre-distorted watermark templates, as described in the exemplary diagram of FIG. 7, can be repeated for each distortion over a particular range, as well as for combinations of distortions. In some embodiments, in order to limit the number of distortions that are carried out on pilot signals to within a practical limit, critical distortion vectors (e.g., distortions due to time/space/frequency scaling attacks over a particular range, camcorder capture, low-bit rate perceptual compression, etc.) are first identified. Then pre-distorted watermark templates for critical distortion vectors, and combinations thereof, are determined. All other distortion vectors (e.g., non-critical distortion vectors) can be tested against the pre-distorted templates of critical distortion vectors to determine if additional pre-distorted watermark templates are needed.

Figure 8:
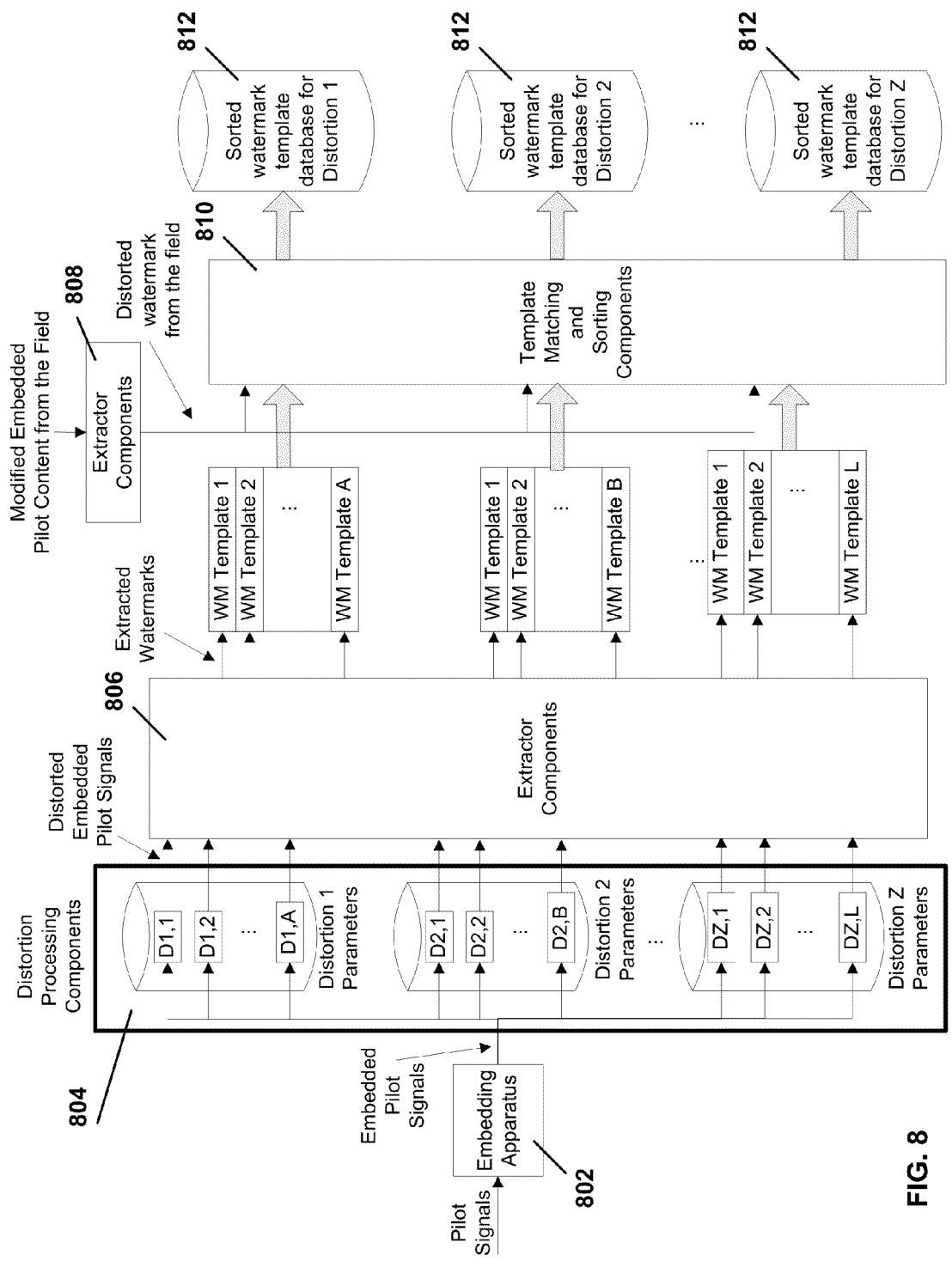
FIG. 8 is a block diagram of certain components that can be used to carry out some or all of the operations of FIG. 7.

FIG. 8 is a simplified diagram of the components that can be used to carry out some or all of the operations 700 of FIG. 7. The embedding apparatus 802 is used to embed the pilot signals that are subsequently subject to various distortions using the distortion processing components 804. The distorted embedded pilot signals that are generated by the distortion processing components 804 are input to the extractor components 806, where pre-distorted watermark templates are generated that correspond to a particular distortion with a particular distortion parameter. In FIG. 8, these watermark templates are labeled "WM Template 1," "WM Template 2," etc. FIG. 8 also depicts the modified embedded pilot content obtained from the field that is input to the extractor components 808. In some embodiments, the extractor components 806 and extractor components 808 are the same physical device. In other embodiments, such as in embodiments where distributed processing is used, the extractor components 806 and extractor components 808 may be different physical entities that can be located at different physical locations.

FIG. 8 further illustrates template matching and sorting components 810 that compare and match the distorted watermarks from the field to the pre-distorted candidate watermark templates that are generated by the extractor components 806. The results of the matching and sorting operations for various distortions are stored in database(s) 812.

In some embodiments, in order to reduce the processing load and the probability of false watermark detection, the extractor may skip one or more of pre-distorted watermark templates at any candidate watermark location. In the sections that follow, this approach is sometime referred to as sparse search over the distortion space. One disadvantage of skipping a subset of per-distorted watermarks is that the extractor can lose the opportunity for watermark extraction. However, if number of opportunities is sufficiently large, the overall impact of missed opportunities can be negligible. Furthermore, in some embodiments, if the extractor finds a tentative watermark at another stage of watermark extraction process (e.g., at a different extraction opportunity), the extractor can be configured to explore some of the missed opportunities, for example, based on tentative watermark extrapolation that is discussed below. In one variation, only the missed opportunities with high probability of successful watermark detection are visited, not all of them. This is achieved by revisiting only those opportunities that match the distortion parameters associated with the detected tentative watermark or watermarks.

In designing a sparse search over the distortion space, the disclosed embodiments can utilize the following two features. First, a subset of pre-distorted watermark templates is selected at random (or pseudo-random). If such a decision is deterministic, an attacker may find the deterministic pattern either experimentally or through reverse engineering, and subsequently adjust the distortion pattern to match the skipped search space to evade watermark detection.

Second, it is advantageous if the extractor knows the likelihood of certain distortions being present. For example, if the watermark conveys a "Theatrical release" state in an audio-visual content, then a typical piracy scenario involves camcordering the content. For this attack scenario, suitable types of pre-distorted templates (e.g., templates that correspond to cropping, stretching, rotation, etc.) are selected with higher probability than other pre-distorted templates (e.g., time/frequency scaling, etc.). Similarly, if the watermark conveys a "Trusted Source" state, indicating that the content is in digitally encrypted format, then perceptual transcoding is a likely attack and pre-distorted templates associated with perceptual compression are selected with a high probability. Generally, the probability of pre-distortion template selection is proportional to the probability of a particular distortion being present in the content, as long as such probability can be estimated.

In some embodiments, distortion calculations are conducted based on two or more distinct watermarks. Two or more distinct watermarks may comprise SYNCH patterns alone, tentative watermarks alone, or a combination of SYNCH and tentative watermarks. When those watermarks have a predefined mutual relationship at the embedder, and the relationship is known to the extractor, any departure from this relationship can be used to calculate the nature and the amount of the distortion. For example if two synchronization patterns in an image are embedded along a horizontal line, and they are detected such that the line connecting them makes an angle against the horizontal line, it can be assumed that the image is rotated by the detected angle. Similarly, if audio watermarks are embedded periodically with the period P, and the extractor finds them spaced apart at P', it can be assumed that the content is time scaled by the factor P'/P.

Distortion calculation based on SYNCH patterns alone may have certain merits such as a reduced processing load. However, the use of tentative watermarks instead of SYNCH patterns can provide a superior performance since tentative watermarks typically have a lower probability of false detection and better location resolution. As noted earlier, the detection of SYNCH patterns is typically characterized by a higher probability of false detection when compared to the detection of watermark packets. This is done to balance the processing load and robustness requirements of the extraction process. Therefore distortion calculations based on embedded SYNCH patterns alone, may produce incorrect or unreliable distortion estimates. However, if a tentative watermark is detected, it provides additional confidence in the presence and location of the detected watermark.

Once the distortion amount is calculated based on the two or more watermarks, the next step is to evaluate if the distortion is realistic. For example, it is safe to assume that image rotation during video camcordering will not be larger than 20 degrees (relative to either a vertical or a horizontal baseline), or that time compression of an audio track will not be larger than 50%. Any distortion amount larger than those predefined limits is likely to render the image or the audio unperceivable and, therefore, a distortion computation that yields values beyond those limits is likely attributed to false watermark detections.

When a realistic distortion amount is detected, then additional pre-distorted watermark templates can be selected and/or generated that correspond to a distortion in the neighborhood of the calculated distortion, and used for further watermark searches. A pre-distorted watermark template can correspond to the SYNCH portion of a watermark frame, the PACKET portion of a watermark frame, the combined SYNCH and PACKET portions of a watermark frame or a fraction of the SYNCH or PACKET portions of the watermark frame. The additional pre-distorted watermark templates may be repeatedly correlated with the extracted watermarks in order to increase the reliability of the watermark detection and the reliability of the distortion calculation. For example, watermark extraction with a new watermark template may yield a watermark with fewer errors or higher correlation value (and thus a higher reliability) than a previously detected tentative watermark. The watermark that is detected with the higher reliability can then be used to re-calculate the amount of estimated distortion. In some real-time applications (e.g., when watermark extraction occurs during real-time playback of a content), it may be difficult to conduct repeated searches over the same segment of the content. Therefore, in some embodiments, the additional pre-distorted watermark templates are used only for subsequent content segments.

Figure 9:
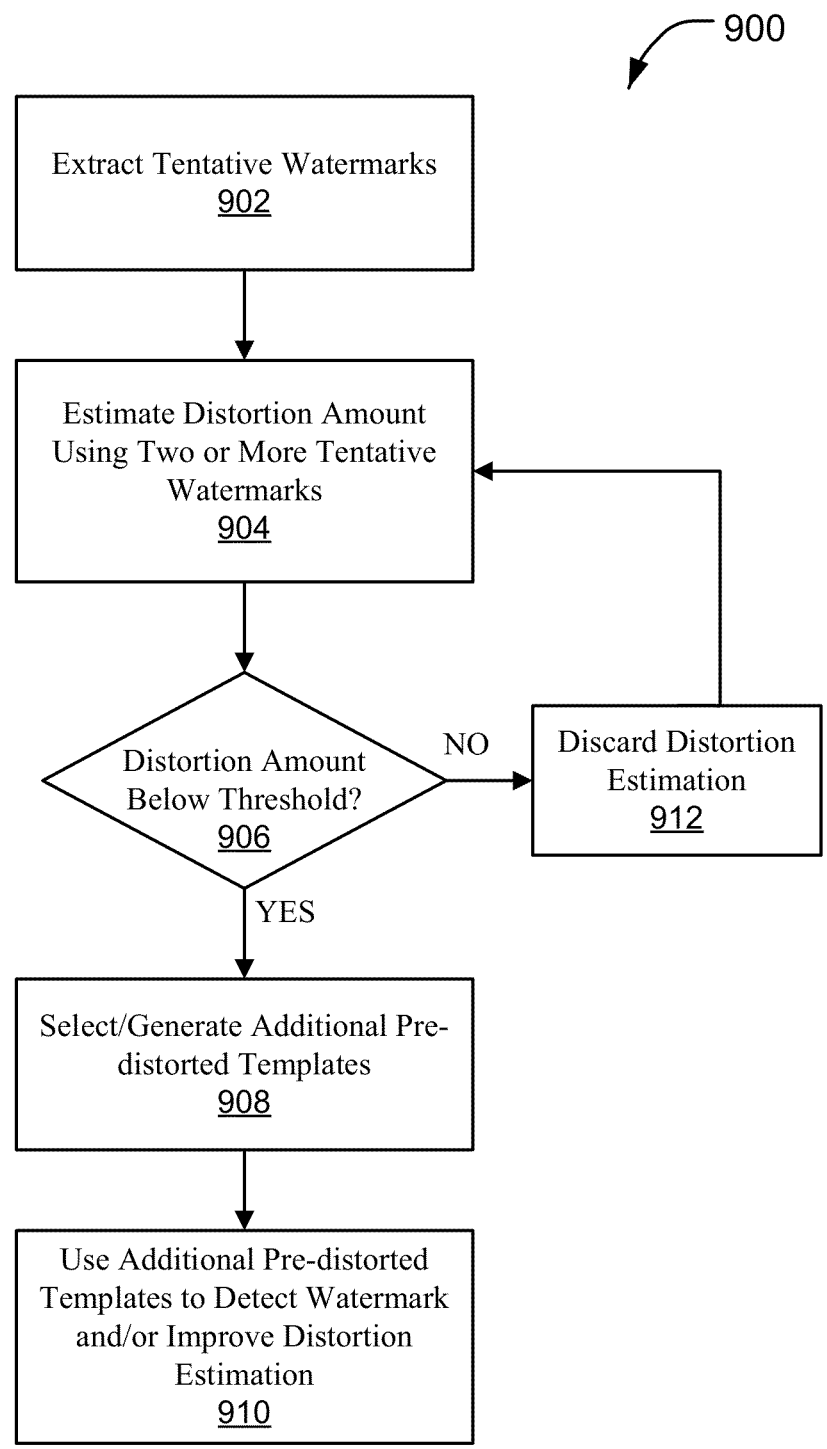
FIG. 9 illustrates a set of operations that can be carried out to facilitate extraction of embedded watermarks in accordance with an exemplary embodiment.

FIG. 9 illustrates a set of operations 900 that can be carried out to facilitate search of the distortion in accordance with an example embodiment. At 902, tentative watermarks are extracted. At 904, the amount of distortion is estimated based on the detection of two or more tentative watermarks. For example, as noted earlier, the spacing between two detected watermarks can be used to estimate the amount of linear time scaling in an audio content. At 906, it is determined if the estimated distortion amount is below a particular threshold. The operations at 906 provide a mechanism to determine if the estimated distortion is realistic. If the estimated distortion is above the threshold, the distortion estimation is discarded at 912. At this point the set of operations 900 returns to 902 to wait until another viable set of tentative watermarks becomes available to repeat the distortion estimations at 904, or to use another set of already available tentative watermarks to produce another estimate of the distortion.

If the distortion estimation is below the threshold (i.e., "YES" at 906), additional pre-distorted watermark templates are selected and/or generated at 908. The "generation" of pre-distorted watermark templates at 908 may be accomplished using an algorithm and the associated parameters that allows the generation of new pre-distorted watermark templates. Alternatively, or additionally, appropriate pre-distorted watermark templates may be selected from a database. At 910, the additional pre-distorted watermark templates are used to detect watermarks with a higher reliability and/or to improve the estimation of content distortion.

In distorted content, the tentative watermarks carry uncertainty about their exact locations and parameters. Therefore the distortion calculations are also approximate. As noted in connection with FIG. 9, additional pre-distorted watermark templates can be selected at 908 to improve watermark detection and/or distortion estimation. In some embodiments, the additional pre-distorted watermark templates are selected in such a way to effect a more efficient and reliable watermark detection and/or distortion estimation. In particular, when generating pre-distorted watermark templates, multiple watermarked contents are distorted in a predefined manner, tentative watermarks are detected, the distortion is estimated based on detected tentative watermarks, and statistics of the errors associated with the calculated distortions are collected. When selecting/generating the additional pre-distorted watermark templates at a watermark extractor (e.g., operation 908 in FIG. 9), such additional pre-distorted watermark templates are selected/generated not only based on the estimated distortion (e.g., obtained from operation 904), but also based on the distortions that fall within the range of expected errors. Therefore, for each estimated distortion amount, multiple pre-distorted watermark templates can be selected, all of them in the vicinity of the estimated distortion. This way, the chances of extracting watermarks with high reliability are significantly improved, without a significant increase in the number of template matching attempts.

In some embodiments, the estimation of the distortion is carried out using a single tentative watermark. As noted earlier, in order to reduce the processing load of the extractor, as well as the probability of false watermark detection, only a subset of pre-distorted watermark templates may be used to conduct an initial search of the embedded watermarks. Such a subset of templates enables a coarse search of the distortion space. When a single tentative watermark is detected using a coarse granulation of the distortion space, there is a good chance that a more reliable watermark may be found if the distortion space is searched with a finer granularity in the vicinity of the distortion parameters that triggered the detection of the tentative watermark.

Figure 10:
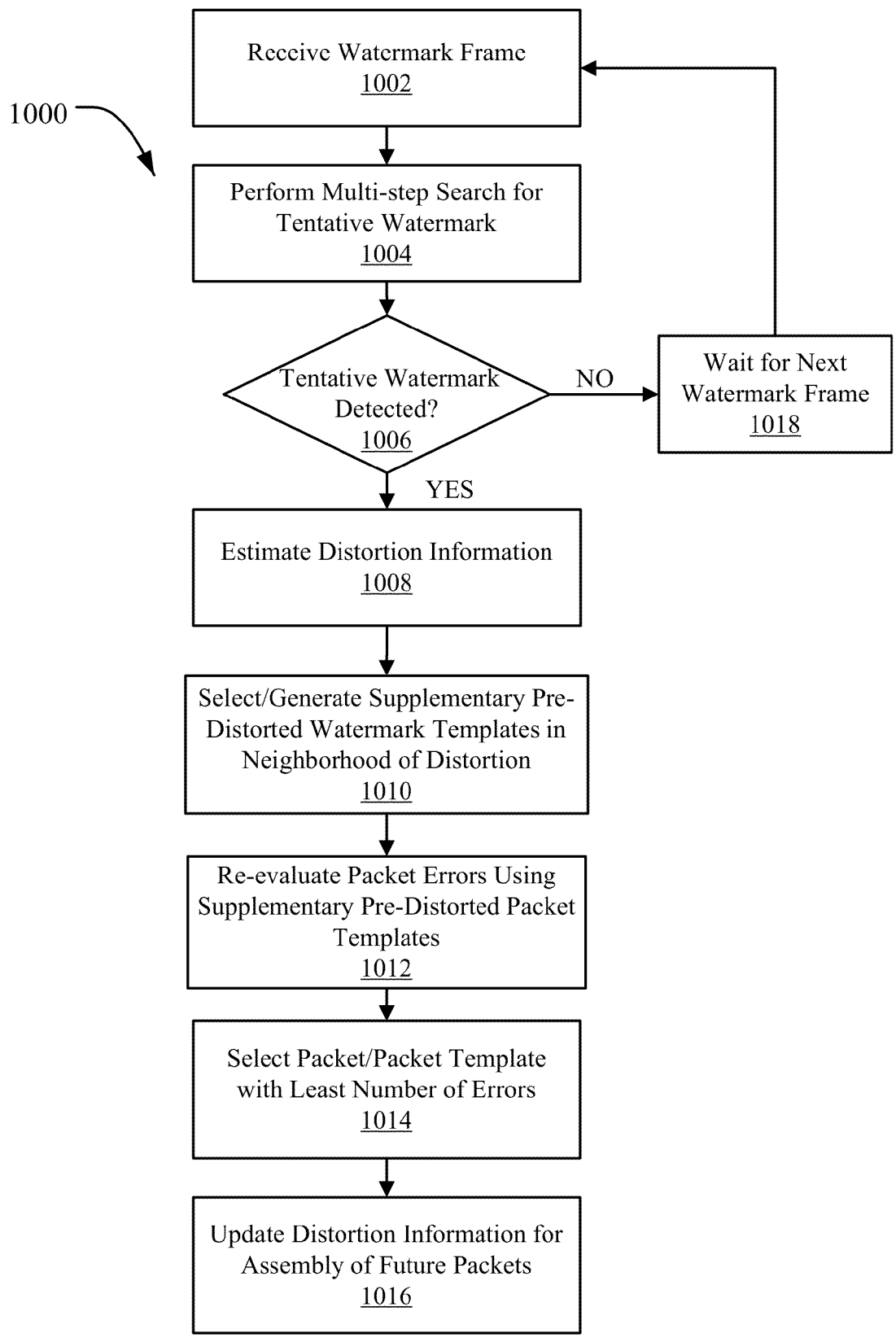
FIG. 10 illustrates a set of operations that can be carried out to extract embedded watermarks from a distorted content in accordance with an exemplary embodiment.

FIG. 10 illustrates a set of operations 1000 that can be carried out to extract embedded watermarks from a distorted content in accordance with an exemplary embodiment. At 1002, a watermark frame is received and, at 1004, a multi-step search for a tentative watermark is conducted. In one example, the operations at 1002 and 1004 are carried out using the set of operations that is described in connection with FIG. 5. At 1006, it is determined if a tentative watermark is detected. If a tentative watermark is not detected, the operations 1000 continue at 1018, where the system waits for the next tentative watermark. If the determination at 1006 indicates that a tentative watermark is detected, the operations 1000 continue at 1008, where distortion information is estimated. The estimation of distortion information can, for example, include the determination of the amount of a particular distortion (or combination of distortions) that is present in the received content. In one embodiment, this estimation can be carried out by assembling (or otherwise obtaining the assembled) one or more SYNCH portions of the watermark frames and comparing them to one or more pre-distorted SYNCH templates that correspond to various amounts of a particular distortion (or combination of distortions). As noted earlier, in some embodiments the estimation of the distortion amount and/or the detection of the tentative watermark are carried out pursuant to a coarse search of the distortion space. Watermark detections that are produced pursuant to such a coarse search provide estimated distortion information that is indicative of a coarse value of a particular distortion, or combination of distortions, present in the embedded host content.

At 1010, additional (or supplementary) pre-distorted watermark templates are selected and/or generated to conduct a finer search of the distortion space. The additionally selected/generated templates correspond to distortion values in the neighborhood of the (coarse) distortion value obtained at 1008. Let us consider a TIPS modification example for an audio content, where the initial set of pre-distorted watermark templates allowed a coarse or sparse search of the time scaling space at 3%, 6% and 9% values. If the audio content in this example is distorted at 3.5%, during the coarse search of the distortion space, the best SYNCH assembly followed by successful tentative watermark packet assembly may be obtained using the pre-distorted watermark templates associated with 3% TIPS. For this example, the selection of additional distorted watermark templates (i.e., the operations at 1010) can include the selection or generation of pre-distorted watermark templates in the neighborhood of the 3% TIPS distortion (e.g., 2.5% to 3.5% in steps of 0.1%).

At 1012, the number of packet errors associated with the tentative watermark is re-evaluated using the newly selected/generated pre-distorted watermark templates. In one embodiment, the candidate recovered PACKET is compared against some or all of the additional pre-distorted watermark templates to produce the associated error counts. As such, the new set of pre-distorted PACKET templates can be used for repeated search over the same content segment where the tentative watermark was detected, or for searches in subsequent content segments.

At 1014, the packet or packet template that produced the least number of errors is selected. The selected packet/packet template corresponds to an amount of distortion that more accurately represents the true amount of distortion that is present in the received content. Therefore, in some scenarios, the re-evaluated packet errors can indicate the presence (and a more accurate location) of an embedded watermark with a higher reliability. For example, operations at 1014 may result in the detection of a strong or conclusive watermark. At 1016, distortion information for assembly of future packets and/or synchronization patterns is updated based on the packet/template that produced the best error values at 1014.

It should be noted that while the operations at 1014 are described as selecting a packet/template that produces the least number of errors, the operations at 1012 and 1014 should also produce a selection that corresponds to a low false positive detection probability. In an alternate embodiment, an iterative procedure is used to enable the extraction of watermarks and estimation of the distortion. In this embodiment, the supplementary pre-distorted watermark templates in the neighborhood of the previously estimated distortion are selected/generated, one at-a-time. For example, a first supplementary pre-distorted watermark template may correspond to a slightly less content distortion than that the pre-distorted watermark template used for tentative watermark detection at 1004. If the first supplementary pre-distorted watermark template produces fewer bit-errors, or higher correlation with candidate watermark, a second supplementary pre-distorted watermark template is selected to correspond to a content distortion that is yet smaller than the first supplementary pre-distorted watermark template. On the other hand, if the first supplementary pre-distorted watermark template results in a larger number of bit-errors, or a reduced correlation value, the second supplementary pre-distorted watermark template is selected to correspond to a content distortion that is greater than the distortion associated with the pre-distorted watermark template used for tentative watermark detection at 1004. The iterations may continue until one of the pre-distorted watermark templates provides the best watermark detection, and the best estimate for the content distortion. In some examples, numerical methods such as the bisection or Newton's method may be used to facilitate the convergence of the iterations. The above described iterative procedure obtains the most reliable estimate of a detected watermark more efficiently and with lower probability of false detections than multiple searches at fine granularity.

In some embodiments, upon the detection of a tentative watermark, extrapolation techniques are used to improve the reliability of watermark detections. In distorted content, individual watermarks may be damaged to the extent that no conclusive watermark detection is possible despite the efforts of distortion calculation and compensation described above. In these situations, the extractor may continue the search for subsequent watermarks in the content in the vicinity of the detected tentative watermarks. However, if one or more additional tentative watermarks are found in subsequent searches, then a joint "weight" of the two or more watermarks may be calculated and used to further re-evaluate the watermark presence.

In some embodiments, an alternative approach may be adopted that relies on watermark embedding patterns to predict the location, symbol pattern and watermarking parameters of neighboring watermarks. Typically we expect repeated embedding of the same watermark throughout the content, but more complex embedding patterns are also possible and, in some cases, advantageous. In some scenarios, for example, the neighboring watermarks may differ from one another in a known way, such as when embedded watermarks include a counter that is incremented with the embedding of every additional watermark packet, or when the payloads of neighboring watermark packets are scrambled with different scrambling keys. In scenarios where the embedded pattern of succeeding and/or preceding watermarks are known, the detection of a tentative watermark can be extrapolated to assess the presence and value of other embedded watermarks in anticipated locations within the content. In some embodiments, the detected tentative watermark is used to predict the existence of other watermark patterns within the content. This prediction is subsequently tested (e.g., using a hypothesis testing statistical method), which can lead to the rejection or confirmation of the validity of watermark detection.

FIG. 11A shows an example watermark frame sequence with SYNCH and PACKET portions similar to those presented in FIG. 3A. Following a successful assembly and detection of the SYNCH, the PACKET is assembled. When significant amount of distortion is applied to the content, it may be hard or impossible to detect the SYNCH portion of the watermark frame. FIG. 11B shows that PACKET #1 is assembled after successful assembly of the preceding SYNCH. However, PACKETS #2 and #3 are not assembled due to severe distortion to the corresponding SYNCH portions of watermark frames #2 and #3. FIG. 11C shows an example where following the detection of a tentative watermark, an extrapolation of the tentative watermark is performed across watermark frames #2 and #3 (that are expected to include PACKETS #2 and #3). In a typical extrapolation scenario, some of the symbols of the extrapolated watermark(s) are expected to match the associated symbols in the non-extrapolated (i.e., tentative) watermark. Upon assembly of the symbols of the extrapolated watermarks, symbol errors are counted, probability of false watermark detections are estimated and weights to the extrapolated watermark(s) are assigned. The assigned weights can be accumulated to collectively assess the presence and value of the watermarks.

The extrapolation techniques of the disclosed embodiments include features that can improve the likelihood of detecting embedded watermarks while keeping the probability of false watermark detections within desirable limits. In particular, in some embodiments, when extrapolating to search for additional watermarks, there is no need to find additional SYNCH patterns in order to assemble the next watermark packet symbols. In distorted content, many SYNCH patterns are likely to be damaged beyond recognition. However, the extrapolation techniques of the present application enable the assembly and usage of packet symbols even if the SYNCH portions of the watermark frames are not detected for all potential watermark frames.

Moreover, in some of the extrapolation techniques of the disclosed embodiments, the number of extraction attempts to detect an extrapolated watermark can be as low as one. Therefore, the weight(s) that are assigned to the extrapolated watermark symbols need not be adjusted to maintain the desired probability of false detections. In certain embodiments, however, in order to account for the uncertainty associated with distortion estimations and the true location of a tentative watermark, watermark extrapolation attempts may be carried out using a few starting offsets and a few distortion estimates. Such an approach facilitates achieving the best tradeoff between robustness and probability of false detections. Even in this scenario, the number of attempts is significantly lower than in systems where weight accumulation is triggered based on independent detection of embedded watermarks. In such independent detection of embedded watermarks, the detection of each watermark (e.g., each tentative watermark) requires the detection of the associated SYNCH portion, as illustrated in FIGS. 3B and 11B.

Figure 12:
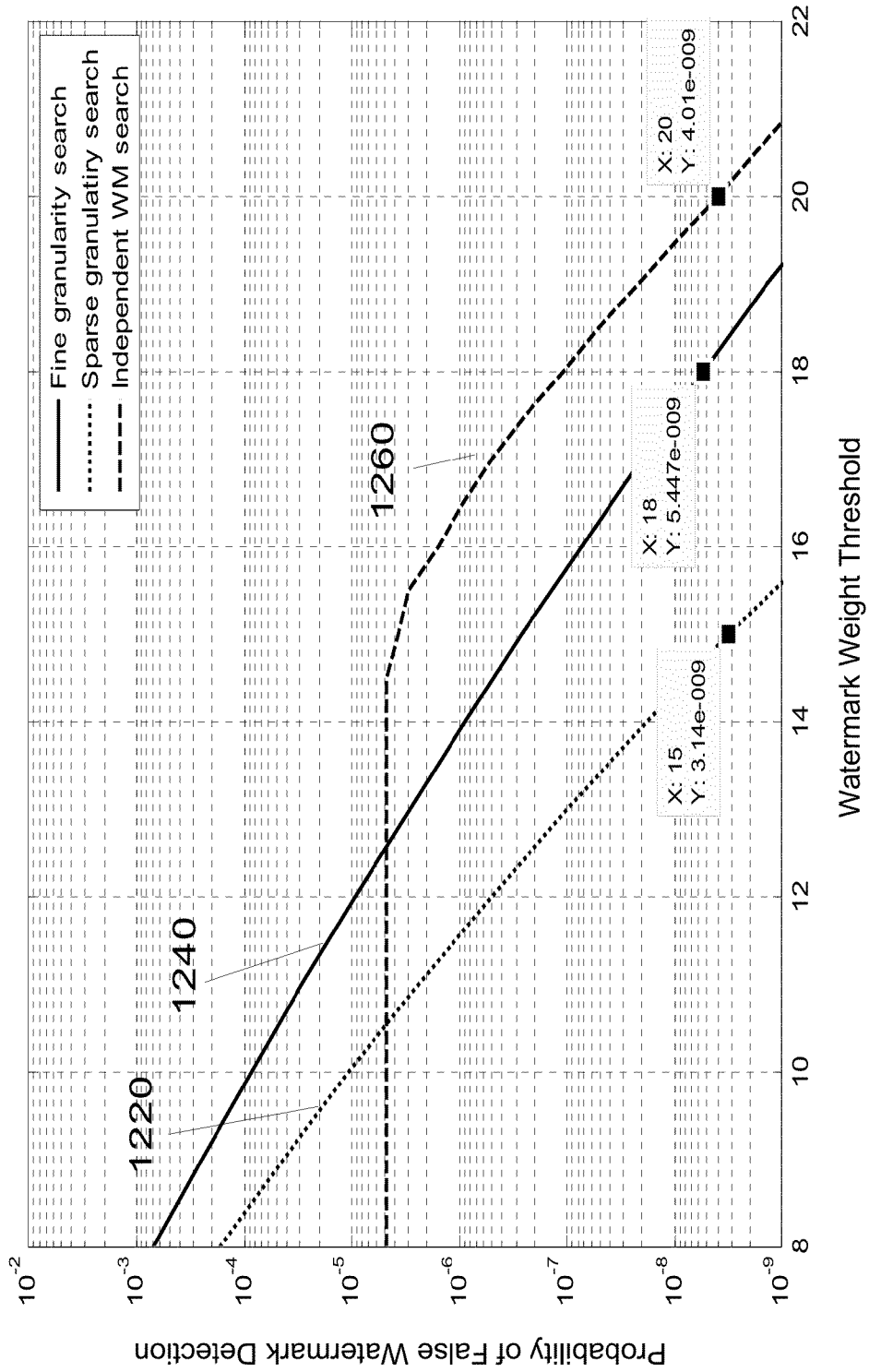
FIG. 12 illustrates exemplary plots of the probability of false watermark detection versus the watermark weight threshold that compares independent watermark search with sparse granularity search and fine granularity search in accordance with an exemplary embodiment.

FIG. 12 shows exemplary plots of the probability of false watermark detection versus the watermark weight threshold. The exemplary plots in FIG. 12 correspond to experimental results obtained for watermark frames with binary symbols, with 32-bit SYNCH portions and 64-bit PACKET portions that were embedded in an audio content. The curve 1220 corresponds to the sparse granularity search of the distortion space and the curve 1240 corresponds to the fine granularity search obtained using the watermark extrapolation techniques of the disclosed embodiments. FIG. 12 also shows a third curve 1260 that corresponds to the probability of false watermark detection for an extractor that operates based on independent recovery of watermarks to effect weight accumulation. Note that for a probability of false watermark detection of about $5 \times 10^{-9}$, the watermark weight threshold using the disclosed tentative watermark extrapolation techniques (both sparse and fine search) is less than the threshold used in independent weight accumulation technique. As such, in comparison with weight accumulation techniques based on independent detection of embedded watermarks, the disclosed extrapolation techniques that are based on extrapolation of a previously detected tentative watermark produce similar or better false positive performance at a lower computational processing load. At the same time, detections that are based on extrapolation of a previously detected tentative watermark require a lower watermark detection threshold value that requires the detection of a tentative watermark as oppose to a conclusive watermark. These features greatly improve the robustness performance of the watermark extractor.

Figure 18:
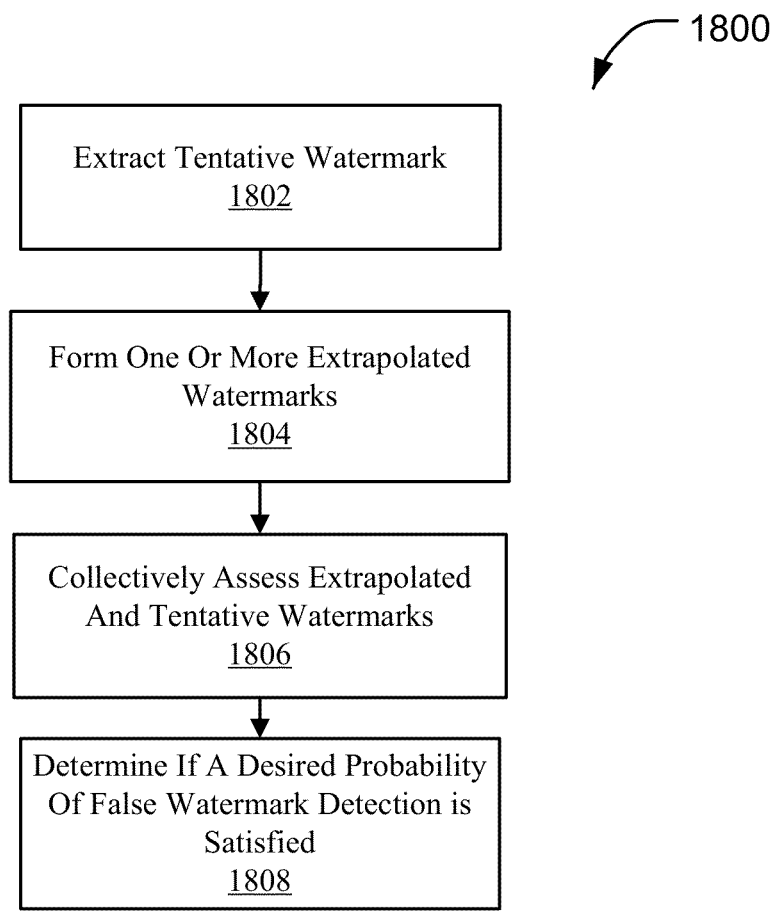
FIG. 18 illustrates a set of operations that can be carried out to extrapolate watermarks in accordance with an exemplary embodiment

FIG. 18 illustrates a set of operations 1800 that can be carried out to extrapolate watermarks in accordance with an exemplary embodiment. At 1802, a tentative watermark is extracted. The operations at 1802 can, for example, include at least some of the operations that were discussed in connection with FIGS. 5, 9 and 10. At 1804, one or more extrapolated watermarks are formed. For example, such a formation of packets may be accomplished by obtaining symbols of potential watermark frames that are positioned within the embedded host content at a predefined location relative to the extracted tentative watermark. At 1806, the extrapolated watermark(s) are collectively assessed with the already-extracted tentative watermark. At 1808, it is determined if the collective assessment of the watermarks results in satisfying a desired probability of false watermark detection. For example, such a desired probability of false watermark detection can correspond to the detection probability associated with a conclusive watermark.

The amount of watermark extrapolation that is carried out in accordance with the disclosed embodiments depends on the nature of the distortion, as well as the precision of distortion estimations. For example, in the case of audio watermarks that are distorted due to acoustic propagation of the host content, time scaling distortion is typically negligible while background noise and reverberations appear to be the main sources of distortion. In this environment, assuming that watermarks are periodically embedded, it is possible to conduct successful extrapolations that span several watermark lengths. On the other hand, if content is subject to time scaling attacks, the precision associated with estimating the time scaling distortion can be limited and, therefore, only a small number of watermark extrapolations in each time direction may be feasible.

In some cases, the distortion varies in time or space either as a result of content transformations or intentional attacks. For example, audio tape players are known to produce wow or flutter artifacts as a result of variations in the speed of the tape players' motors. As a result, the produced time scaling factor changes with time based on the variations of the motor speed. Similar techniques can be adopted by attackers in order to interfere with proper estimation and compensation of time scaling distortions in a watermarked content. One caveat, however, is that time-varying distortions that are too fast and/or too large typically produce objectionable perceptible artifacts and reduce the viability of the attack. Therefore, it may be beneficial to develop more effective countermeasures that increase the robustness of watermark extraction in the presence of time varying distortions that slowly vary over the watermark duration.

Experiments conducted by the inventors indicate that, when distortion varies slowly over the length of the watermark, tentative watermark detection is often achieved with pre-distorted SYNCH templates that roughly fit somewhere within the distortion variation range. However, over the duration of a watermark PACKET, which is typically larger than the SYNCH portion, the distortion may fluctuate to values that are outside of the detection range of pre-distorted watermark templates. This means that a pre-distorted packet template may only match to the actual distortion for limited sections of the watermark frame, thereby causing significant symbol error rates.

According to some embodiments, in cases where the embedded watermark symbol pattern is known before hand (e.g., through previously detected tentative watermark payload, by considering only a limited set of payloads, etc.), the entire watermark interval is divided into segments and watermark extraction attempts are conducted for each segment. This operation can be better understood by reference to in FIG. 11D. Note that the horizontal scale in FIG. 11D may be different from those in FIGS. 11A to 11C. Starting with the distortion estimate obtained from the SYNCH detection and/or tentative watermark detection of PACKET #1, the extraction of the first watermark segment, SEG 1, is attempted using one or more of the pre-distorted watermark templates that correspond to the estimated distortion value. In some embodiments, SEG 1 includes all or a portion of the SYNCH that is expected to follow PACKET #1. For instance, if a watermark frame consists of a 20-bit SYNCH and a 100-bit PACKET, in one example, each segment can comprise 20 bits (i.e., 6 segments per frame). In another example, each segment can comprise 30 bits (i.e., 4 segments per frame). In yet another example, each segment can comprise 10 bits (i.e., 12 segments per frame). In still another example, the SYNCH portion may be skipped and only segment matching for the PACKET portion of the watermark frame may be carried out. The above examples are not intended to provide an exhaustive list of different segment sizes and segmentation configurations, but are provided to illustrate that different segment sizes and configurations can be selected based on the needs and capabilities of the watermark detection system and the target application.

In some embodiments, the number of segments is selected based on an extent (e.g., duration, spatial extent, etc.) of the extracted tentative watermark. For example, watermarks with a smaller payload may be segmented into fewer segments than watermarks with larger payloads. Other factors in determining the number of segments is the amount of distortion(s) present (or anticipated to be present) in the embedded host content, and/or the type of distortion(s) present (or anticipated to be present) in the embedded host content. The selection of the number of segments can change dynamically based on, for example, the amount and type of distortion, or can be done statically or semi-statically, where the number of segments is fixed. Moreover, the length of each segment can be selected based on amounts and/or types of anticipated distortions in the content.

Referring back to FIG. 11D, in some embodiments, a pre-distorted watermark template closest to the estimated distortion value is used for extrapolated detection of SEG 1, as well as one or more pre-distorted watermark templates that correspond to distortions in the vicinity of the estimated distortion value. Whichever matching attempt produces the best result, its associated distortion level is used as the starting distortion estimate for the next segment, SEG 2. The above noted operations continue for other segments, SEG 2, . . . , SEG K, of the extrapolated watermarks. This way, the slowly varying distortion can be effectively tracked and mitigated by utilizing the proper pre-distorted watermark templates.

Figure 13:
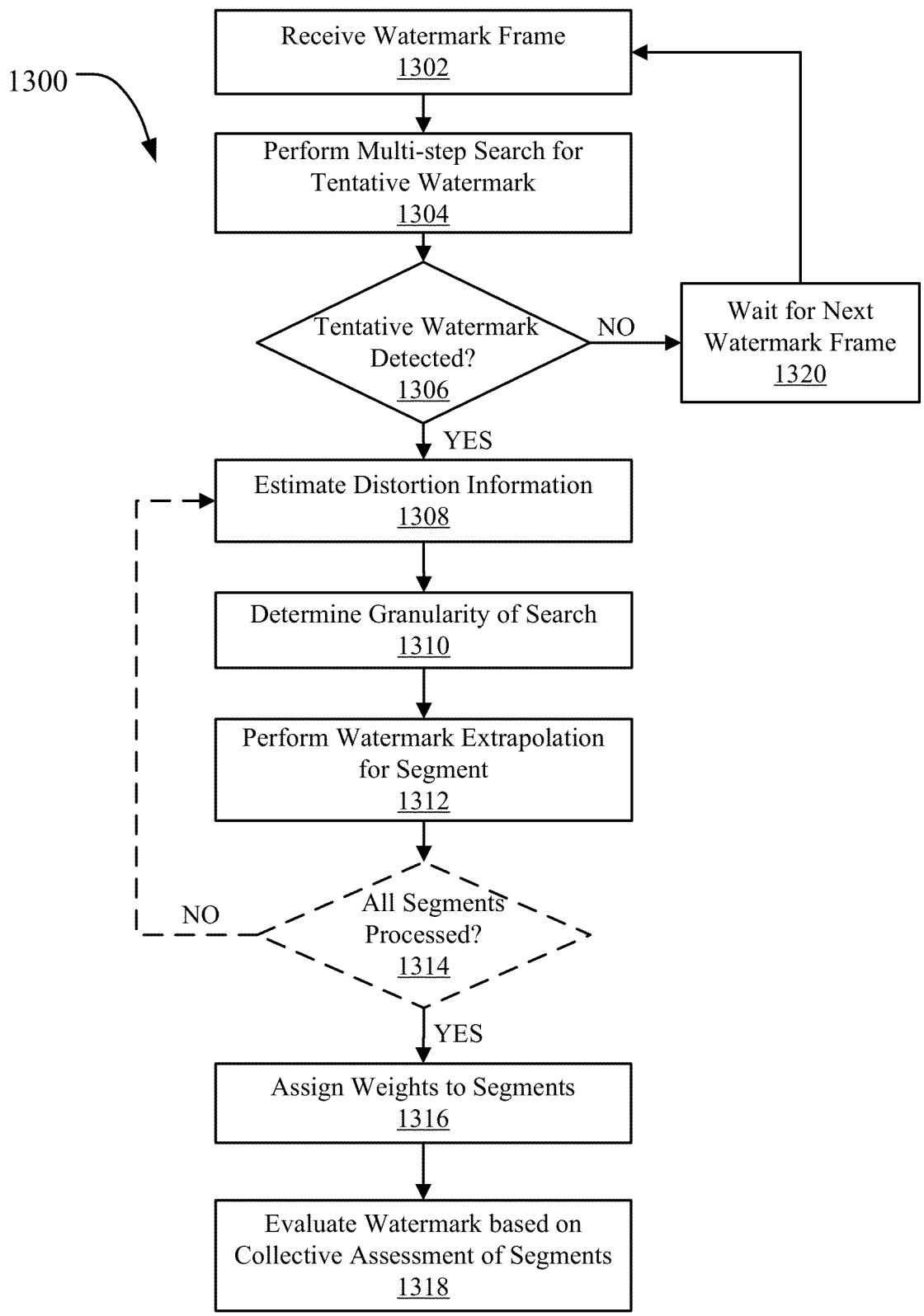
FIG. 13 illustrates a set of operations 1300 that can be carried out to extrapolate watermarks on a segment-by-segment basis in accordance with an exemplary embodiment.

FIG. 13 illustrates a set of operations 1300 that can be carried out to extrapolate watermarks on a segment-by-segment basis in accordance with an exemplary embodiment. At 1302, a watermark frame is received and, at 1304, a multi-step search for a tentative watermark is conducted. In one example, the operations at 1302 and 1304 are carried out using the set of operations that are described in connection with FIG. 5. At 1306, it is determined if a tentative watermark is detected. If a tentative watermark is not detected, the set of operations 1300 continue at 1320, where the system waits for the next frame, and then repeats operations that are conducted at 1302 through 1306. If the determination at 1306 is indicative of a detection of tentative watermark (i.e., "YES" at 1306), the set of operations 1300 continues at 1308, where distortion information is estimated. The estimation of distortion information can, for example, include the determination of the amount and type of a distortion (or a combination of distortions) present in the received content. In one embodiment, this estimation can be carried out by assembling the SYNCH portion of the watermark frame (or obtaining the already assembled SYNCH portion) and comparing it to one or more pre-distorted SYNCH templates that correspond to various amounts of a particular distortion (or distortions). As noted earlier, the estimation of the distortion amount and/or the detection of the tentative watermark are typically carried out pursuant to a coarse search of the distortion space.

At 1310, the granularity of the search is determined. The granularity of the search (e.g., the number of pre-distorted packets and their spacing in the distortion space) may be initially selected based on certain default values, may be adjusted for the initial segment assessment based on the estimated distortion information and/or may be based on error minimization criteria on a segment-by-segment basis. The criteria can be selected based on the desired probability of false watermark detection, robustness and computational complexity. In some embodiments, the criteria are adapted in response to the observed or anticipated distortions. Based on the error minimization criteria, pre-distorted watermark templates at the segment level (which may reside locally at the watermark extractor or remotely at a database) are re-arranged and re-sorted to conform to the error minimization criteria. Further, the selection rules for selecting the pre-distorted watermark templates can be updated to enable the watermark extrapolator to select the best set of pre-distorted watermark segment templates. In some embodiments, the error minimization criteria further triggers the selection of a new stego key that can be used to extract subsequent watermarks. The stego key selection can be done in such a way to optimize at least one of robustness, security, and computational efficiency for the extraction of watermarks embedded in the host content. Additionally, the selecting of the one or more stego keys may be adapted to anticipate transformations of the host content. For example, the transformations may alter the appearance of at least one watermark that is embedded with a first embedding stego key such that the at least one embedded watermark appears to have been embedded with a second embedding stego key.

Referring back to FIG. 13, at 1312, watermark extrapolation for the segment under consideration is performed. In some embodiments, the operations at 1312 comprise comparing the symbols of the segment under consideration to one or more pre-distorted watermark templates at the segment level. For example, such a comparison can be carried out using a bit-wise exclusive OR (XOR) operation between the segment bits and the bits of the pre-distorted watermark template. Based on the granularity of the search and the estimated distortion information, one or more extrapolation attempts may be conducted that, for example, produces one or more error values. The operations at 1312 further comprise selecting the best match result (e.g., one that produces the least number of errors). At 1314, it is optionally determined if all segments have been processed. Such a determination can be made by comparing the number of segments that have been processed so far to the number of segments that are anticipated to comprise a watermark packet based on factors that include the length of detected tentative watermark packet, the amount and type of distortion that is present, and the like. In some embodiments, it is not necessary to process all the segments. As such, the subsequent operations (i.e., operations at 1316 and 1318) may be carried out upon extrapolation of one or more segments that collectively span a smaller extent (e.g., duration, spatial extent, etc.) than the tentative watermark. In these embodiments, the operations at 1314 may comprise the determination as to whether or not a predetermined number of segments in the range 1 to k have been processed. In some embodiments, k is the number of segments that are anticipated to comprise one watermark packet. In other embodiments, k is the number of segments that are anticipated to comprise more than one watermark packet. In embodiments where the processed segments collectively span a smaller extent than the tentative watermark, additional extrapolated segments can be processed and evaluated if the operation at 1318 fails to produce the desired results.

Referring back to FIG. 13, and assuming that the operation at 1314 is carried out, if the determination at 1314 indicates that additional segments must be processed (i.e., "NO" at 1314), the set of operations 1300 returns to 1308, and new estimations of the distortion information is obtained based on the results of extrapolation of the previous segment. For example, at 1308, an estimate of the distortion space can be refined (e.g., based on the pre-distorted watermark template that produced the best match result at 1312).

If the determination at 1314 indicates that all segments have been processed ("YES" at 1314), the set of operations 1300 continues at 1316, where weights are assigned to each segment. In one example, the weights are assigned according to Equations (9) and (10) that are provided in the sections that follow. At 1318, the presence and value of the watermark are evaluated based on collective assessment of one or more segments. For example, weights that are assigned at 1316 can be added together and compared to a weight threshold that signifies the detection of a watermark with a particular level of reliability. It should be noted that the set of operations 1300 that are depicted in FIG. 13 may be carried out in a different sequential order. For example, the assignment of weights to each segment can be carried out at the same time, or immediately after, performing watermark extrapolation for that segment. It should be further noted that the process of distortion tracking described above also increases the probability of false watermark detection. Therefore, care needs to be taken to ensure that the probability of false conclusive watermark detection stays within predefined limits.

Figure 14:
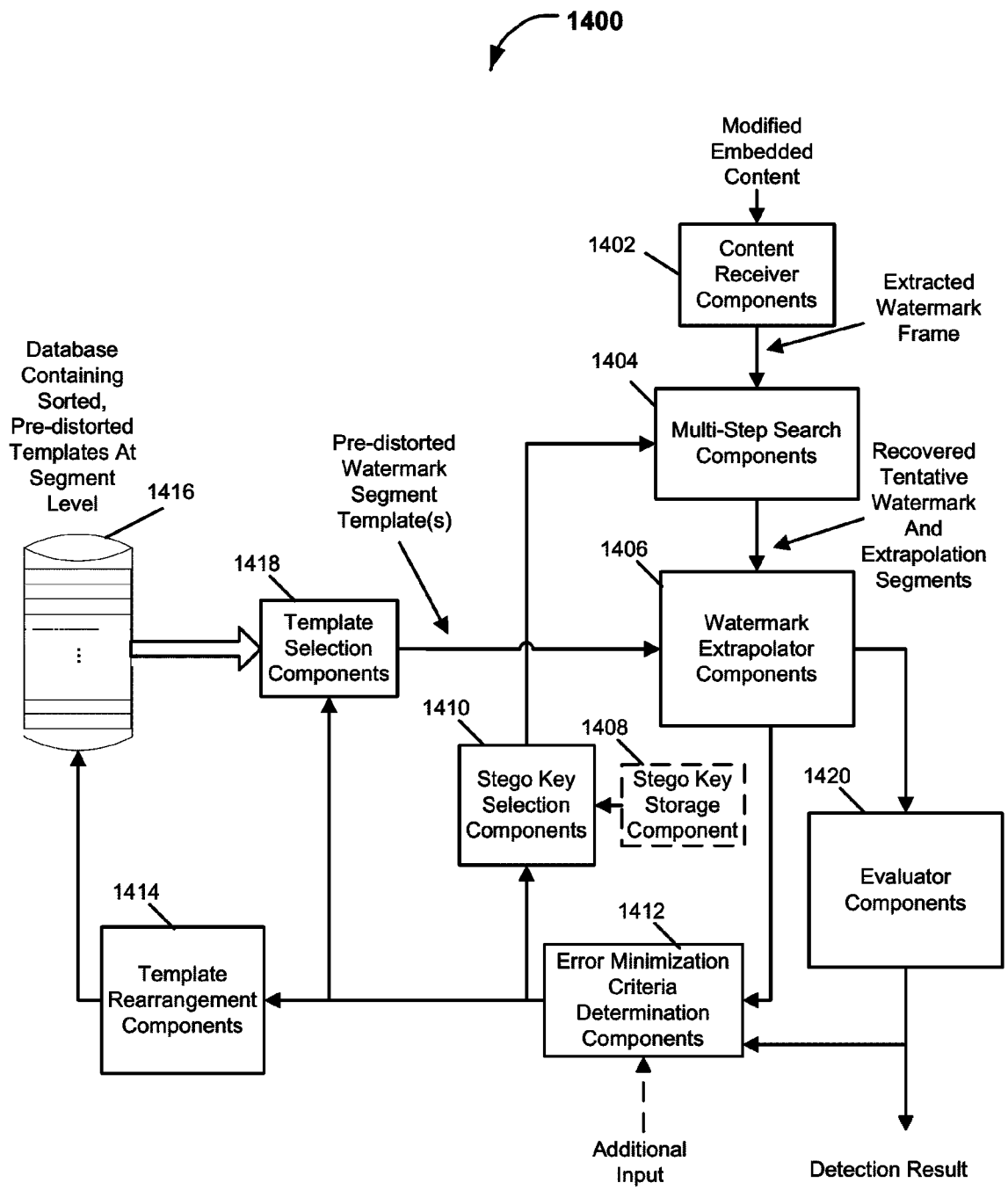
FIG. 14 is a block diagram of certain components that can be used to carry out some or all of the operations of FIG. 13 and or FIG. 18 in accordance with exemplary embodiments.

FIG. 14 is a simplified diagram of certain components that can be used to carry out some or all of the operations of FIG. 13 and/or FIG. 18 in accordance with the disclosed embodiments. The components that are shown in FIG. 14 may reside, at least in-part, in a content handling device that can, for example, play, record, copy, transfer, or otherwise access a content. The content receiver components 1402 are configured to receive the modified embedded content. The modified embedded content may, for example, be a content that contains embedded watermark and has been subjected to intentional or unintentional distortions. The received modified embedded content is provided, in proper format, to the multi-step search components 1404 that are configured to produce one or more tentative watermarks and the segments that will be the subject of extrapolation. The multi-step search components 1404 may utilize a stego key that can be supplied by the stego key selection components 1410. The stego keys may be stored on a stego key storage component 1408. The watermark extrapolator components 1406 are configured to perform watermark extrapolation, either for an entire watermark frame or on a segment-by-segment basis. In some embodiments, the template selection components 1418 are configured to receive/retrieve pre-distorted watermark templates, in full, or on a segment-by-segment basis. For example, the template selection components 1418 can retrieve one or more pre-distorted watermark templates from the database 1416 and make them available to the watermark extrapolator components 1406.

Referring back to FIG. 14, the error minimization criteria determination components 1412 are configured to receive the results produced by the watermark extrapolator components 1406. The error minimization criteria determination components 1412 may be further configured to receive additional input from a user, or an entity within the larger system or device, that allows error minimization criteria determination components 1412 to determine a desired search granularity. The error minimization criteria determination components 1412 are further configured to communicate with the stego key selection components 1410, the template selection components 1418 and the template rearrangement components 1414 to, for example, convey a new search granularity, update template selection rules, and the like. The template rearrangement components 1414 are configured to rearrange the pre-distorted watermark templates based on information that is provided by the error minimization criteria determination components 1412. The template rearrangement components 1414 can retrieve and store the pre-distorted watermark templates from/to the database 1416. The evaluator components 1420 can perform various watermark assessment operations, such as assigning weights to the extrapolated segments or watermarks, comparing the extrapolated watermarks, or segments thereof, to pre-distorted templates, determining if the collective assessment of extrapolated watermarks or watermark segments conforms to the desired probability of false watermark detection, report an amount and type of distortion present in the host content, and the like. In some embodiments, the evaluator components 1420 are incorporated into the watermark extrapolator components 1406.

According to some embodiments, watermark extraction is facilitated depending on the nature of errors that may contaminate or distort a content. In particular, content processing and/or intentional content attacks can inject random or burst errors into the watermarks that are embedded in the content. For example, burst errors in a video image captured by a camcorder can be caused by a sudden camcorder movement, and burst errors in the captured audio may be caused, for example, by unwanted sounds in the background (such as a person's cough). According to some embodiments, in the presence of burst errors, the performance of the watermark extraction system can be enhanced if the probability of false watermark detection is estimated for watermark segments rather than for the entire watermark. To achieve this enhancement in watermark extraction, and to reduce the processing load, in one example embodiment, weights of individual segments are calculated and accumulated over the entire watermark instead of calculating the weight for the entire watermark itself.

The following example embodiment illustrates how to estimate weights for individual watermark segments. Let us assume that a watermark segment is represented by a string of n bits, and an extractor discovers that a particular segment contains e bit-errors. The number errors, e, can, for example, be determined by comparing the bits that comprise the segment with a template that represents the actual bits in that watermark segment. Weight, W(n,e), associated with such a segment can be represented by Equation (9) below.

$$W(n, e) = -\log_{10}\left(2^{-n}\sum_{i=0}^{e}\binom{n}{i}\right) - w_u(n). \quad (9)$$

In Equation (9), $w_u(n)$ represents the expected weight of an un-watermarked segment of length n, which can be represented according Equation (10) below.

$$w_u(n) = -\sum_{j=0}^{n} 2^{-n}\binom{n}{j}\log_{10}\left(2^{-n}\sum_{i=0}^{j}\binom{n}{i}\right). \quad (10)$$

Figure 15:
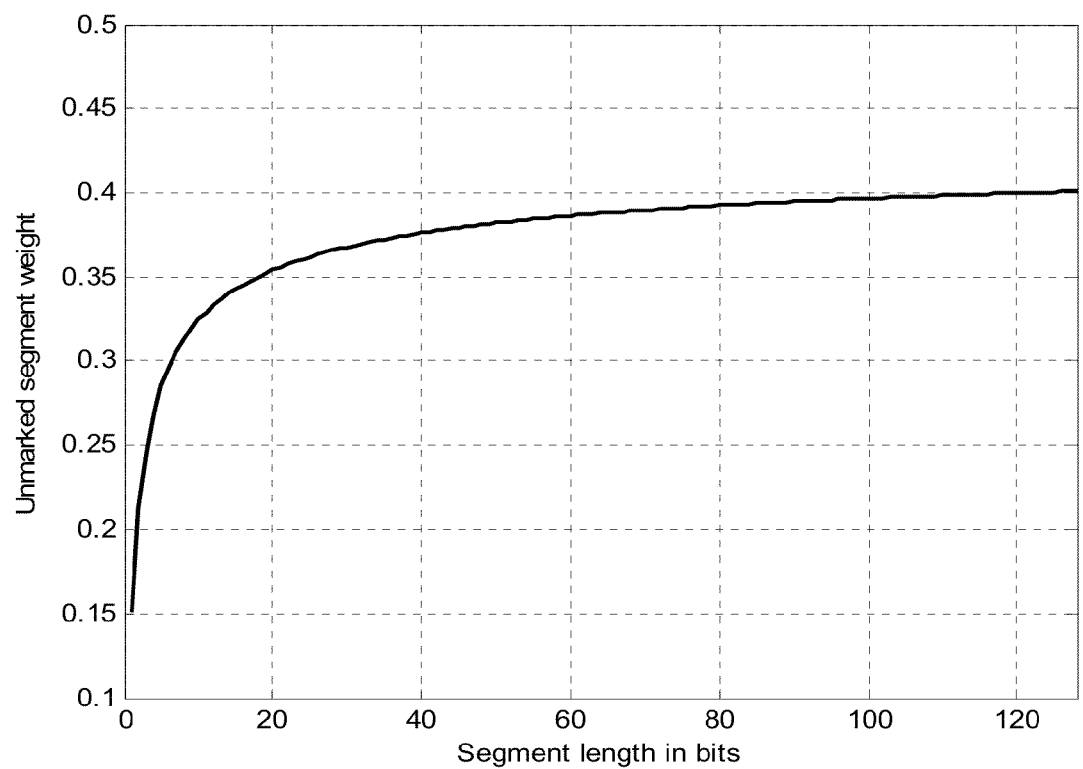
FIG. 15 shows a plot of the expected weight of an un-watermarked segment in accordance with an exemplary embodiment.

FIG. 15 shows an exemplary plot of the expected weight of an un-watermarked segment as a function of segment length, n, in bits that is produced based on Equation (10). To illustrate the utilization of Equations (9) and (10) and the plot in FIG. 15, let us consider a 64-bit candidate watermark PACKET with 20 bits in error. According to Equation (9), the weight associated with such a packet is 2.3462. However, if the watermark is divided into two 32-bit segments, and if an error burst happens to cause 16 bit errors in the first segment and 4 bit errors in the second segment, the accumulated weight for the two segments is 4.52. Therefore, by examining the two segments separately and then combining the results, the presence of the watermark with a higher confidence can be established. In some embodiments, the segment length (or more generally the segment extent as may be applicable to multi-dimensional watermarks) is selected in such a way to facilitate (or optimize) the detection of watermarks in different distortion environments. For example, if an embedded content is transmitted through a communication channel (or is subject to a particular type of distortion) that is likely to produce burst errors, a segment length in a particular range (e.g., $4 \leq n \leq 10$) can be selected. In other examples, the potential watermark can be evaluated using some or all of possible segment lengths (e.g., $2 \leq n \leq$ (watermark frame length/2)) in an iterative fashion in order to select a segment length that produces the highest accumulated weight.

In many cases, multiple watermarks are embedded into the same content, each carrying a different payload. For example, a content may simultaneously carry watermark messages intended for copy-control, content identification, identification of content owner, identification of distributor and/or recipient, providing synchronized operations with external applications, and the like. In these cases, different watermarks may have different performance requirements regarding payload size, robustness, security, probability of false detections, processing load and other requirements. In these systems, each watermark message can often be independently embedded and extracted.

When multiple watermark messages are embedded in a content, extraction of one or both of the embedded watermark messages can be greatly enhanced by extracting the watermark messages in a coordinated fashion. In particular, in some embodiments, distortion estimations that are carried out for a first watermark message can be reused to facilitate the extraction of a second watermark message that has different performance requirements than the first watermark message. Typically the watermark message with a lower payload size, such as a copy-control watermark, can be more efficiently used to estimate content distortion than a watermark message with a larger payload size, such as a content identification watermark, and/or a forensic watermark that is used to distinguish different copies of the content. For example, having a watermark message with a smaller payload can enable the use of more powerful error correction capabilities. Further, watermark messages with a smaller footprint may be less susceptible to time/space varying distortions and can be embedded at greater numbers, thereby improving the robustness of watermark extraction. In addition, having a small payload can enable the use of more efficient search algorithms that are based on template matching as opposed to error correction decoding procedures. Therefore, in some embodiments, distortion estimations are conducted based on watermark messages with a smaller payload size, and the results are used to conduct targeted extraction attempts for watermark messages with a larger payload size.

According to some embodiments, when multiple watermark messages are present in a content, the extraction of the embedded watermarks is further improved by initiating the extraction of a watermarks with a larger payload (and lower robustness) only when a tentative watermark with a smaller payload is detected. This way, significant computational savings can be achieved since futile searches for the larger-payload watermark in an un-watermarked content is prevented. Further, even in a marked content, multiple searches over the distortion space for the larger-payload watermark are eliminated. Having to conduct fewer searches also reduces the probability of false watermark detection associated with the larger-payload watermarks. Experiments conducted by the inventors have revealed that, in some scenarios, linking the search for a larger-payload watermark message to the detection of a conclusive lower-payload watermark message produces negligible improvement in watermark extraction efficiency and false positive rates, but can significantly reduce the robustness of larger-payload watermark messages. That is, extraction of the larger-payload watermark messages is not triggered often enough and, as a result, ample opportunities for the detection of the larger-payload watermarks are wasted. Therefore, as noted earlier, triggering the larger-payload watermark message based on the detection of a tentative smaller-payload watermark message improves the efficiency and processing load of the extraction operations, while providing a reasonably robust detection results for the larger-payload watermark messages.

It is understood that the various embodiments of the present disclosure may be implemented individually, or collectively, in devices comprised of various hardware and/or software modules and components. In describing the disclosed embodiments, sometimes separate components have been illustrated as being configured to carry out one or more operations. It is understood, however, that two or more of such components can be combined together and/or each component may comprise sub-components that are not depicted. Further, the operations that are described in various figures of the present application are presented in a particular sequential order in order to facilitate the understanding of the underlying concepts. It is understood, however, that such operations may be conducted in a different sequential order, and further, additional or fewer steps may be used to carry out the various disclosed operations.

Figure 16:
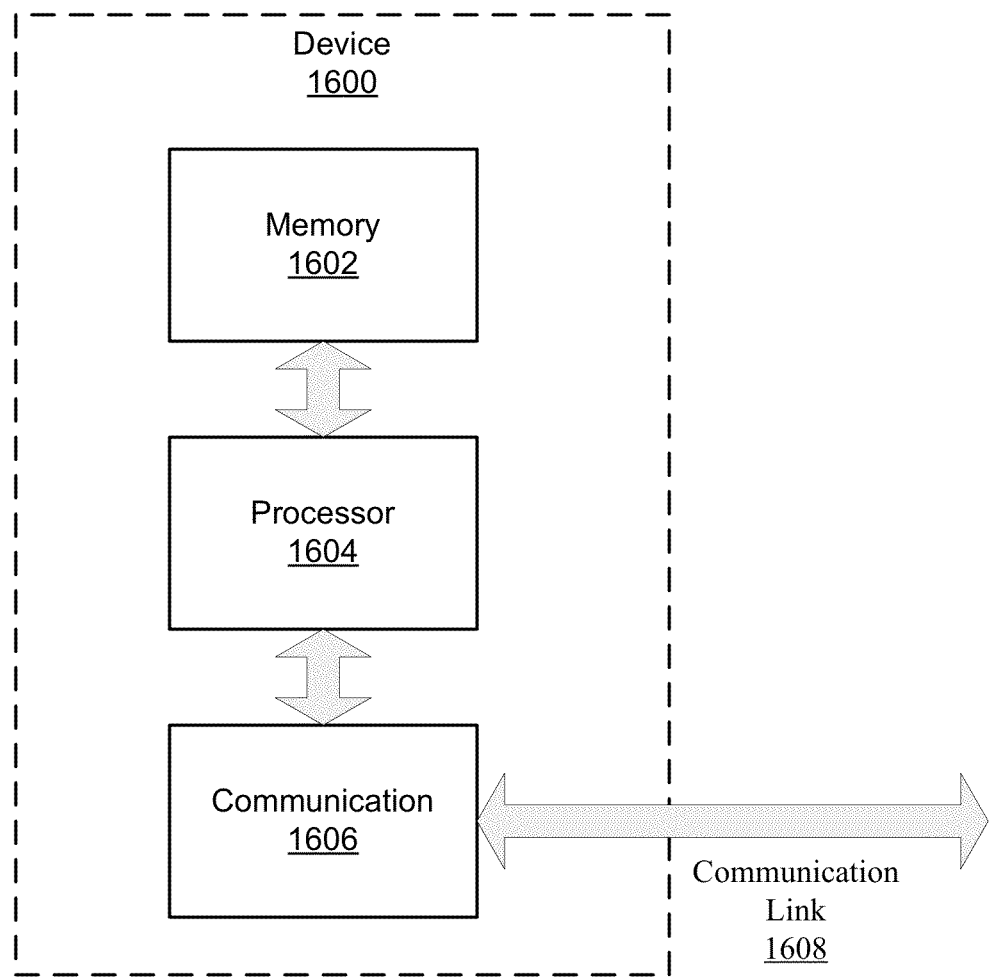
FIG. 16 illustrates a simplified diagram of a device within which various disclosed embodiments may be implemented.

In some examples, the devices that are described in the present application can comprise a processor, a memory unit, an interface that are communicatively connected to each other, and may range from desktop and/or laptop computers, to consumer electronic devices such as media players, mobile devices and the like. For example, FIG. 16 illustrates a block diagram of a device 1600 within which various disclosed embodiments may be implemented. The device 1600 comprises at least one processor 1602 and/or controller, at least one memory 1604 unit that is in communication with the processor 1602, and at least one communication unit 1606 that enables the exchange of data and information, directly or indirectly, through the communication link 1608 with other entities, devices, databases and networks. The communication unit 1606 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device 1600 that is depicted in FIG. 16 may be integrated into as part of a content handling device, a watermark embedding and/or extraction device Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. A content that is embedded with watermarks in accordance with the disclosed embodiments may be stored on a storage medium. In some embodiments, such a stored content that includes one or more imperceptibly embedded watermarks, when accessed by a content handling device (e.g., a software or hardware media player) that is equipped with a watermark extractor, can trigger a watermark extraction process, the associated signal processing operations, as well as subsequent operations by the watermark extractor and/or the content handling device that are disclosed in the present application.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
extracting a tentative watermark from an embedded host content, the tentative watermark representing a candidate watermark with an associated probability of false watermark detection that exceeds a desired probability of false watermark detection;
forming one or more extrapolated watermarks by obtaining symbols of potential watermark frames that are positioned within the embedded host content at a predefined location relative to the extracted tentative watermark; and
determining if the extrapolated watermarks, when collectively assessed with the detected tentative watermark, satisfy a desired probability of false watermark detection.

2. The method of claim 1, wherein the symbols of the potential watermark frames are positioned within the embedded host content at predefined temporal and/or spatial locations relative to the extracted tentative watermark.

3. The method of claim 1, wherein the determining comprises:
determining a number of erroneous symbols in one or more of the extrapolated watermarks;

assigning weights to the one or more of the extrapolated watermarks based, at least in-part, on the determined number of erroneous symbols; and determining if the weighted extrapolated watermark(s), when combined with the detected tentative watermark, satisfy the desired probability of false watermark detection.

4. The method of claim 3, wherein the number of erroneous symbols in each extrapolated watermark is determined by one or more of:

a comparison of the extrapolated watermark symbols to symbols of the extracted tentative watermark;

performing an error correction code decoding of the extrapolated watermark symbols; and a comparison of the extrapolated watermarks to one or more pre-distorted watermark templates.

5. The method of claim 1, wherein:

forming the extrapolated watermarks comprises obtaining symbols of the potential watermark frame on a segment-by-segment basis, wherein each segment comprises two of more watermark symbols; and the determining comprises:

obtaining a number of erroneous symbols in one or more segments;

assigning weights to each of the one or more segments based, at least in-part, on the number of erroneous symbols in each of the one or more segments;

combining the assigned weights associated with the one or more segments to produce one or more weighted extrapolated watermark sections; and determining if the weighted extrapolated watermark sections, when combined with the detected tentative watermark, satisfy the desired probability of false watermark detection.

6. The method of claim 5, wherein obtaining the number of erroneous symbols in each of the one or more segments comprises:

comparing the symbols of the potential watermark frame in each of the one or more segments to one or more pre-distorted watermark templates; and producing a count for each of the one or more segments representative of a number of mismatched symbols between the symbols of the potential watermark frame in the one or more segments and the one or more pre-distorted watermark templates.

7. The method of claim 5, wherein a number of segments within the extrapolated watermark(s) is determined based on one or more of:

an extent of the extracted tentative watermark;

an amount of distortion present in the embedded host content; and a type of distortion present in the embedded host content.

8. The method of claim 5, wherein the weight to a particular segment is assigned, at least in-part, based on an expected weight of an un-watermarked segment equal in length to the particular segment.

9. The method of claim 1, wherein the desired probability of false watermark detection corresponds to detection of a conclusive watermark.

10. The method of claim 1, further comprising reporting an estimate of amount and type of distortion, or combination of distortions, present in the embedded host content.

11. The method of claim 5, wherein an extent of each segment is determined based, at least in-part, on one or more of:

an amount of distortion expected to be present in the embedded host content; and a type of distortion expected to be present in the embedded host content.

12. The method of claim 5, wherein the determining is carried out for the one or more segments that collectively span a smaller extent than the tentative watermark.

13. A device, comprising an extractor implemented at least partially in hardware and configured to extract a tentative watermark from an embedded host content, the tentative watermark representing a candidate watermark with an associated probability of false watermark detection that exceeds a desired probability of false watermark detection;

a watermark extrapolator implemented at least partially in hardware and configured to form one or more extrapolated watermarks by obtaining symbols of potential watermark frames that are positioned within the embedded host content at a predefined location relative to the extracted tentative watermark; and an evaluator implemented at least partially in hardware and configured to determine if the extrapolated watermarks, when collectively assessed with the detected tentative watermark, satisfy a desired probability of false watermark detection.

14. The device of claim 13, wherein the watermark extrapolator is configured to obtain the symbols of the potential watermark frames from positions within the embedded host content that are at predefined temporal and/or spatial locations relative to the extracted tentative watermark.

15. The device of claim 13, wherein the evaluator is configured to:

determine a number of erroneous symbols in one or more of the extrapolated watermarks;

assign weights to the one or more of the extrapolated watermarks based, at least in-part, on the determined number of erroneous symbols; and determine if the weighted extrapolated watermark(s), when combined with the detected tentative watermark, satisfy the desired probability of false watermark detection.

16. The device of claim 15, wherein the number of erroneous symbols in each extrapolated watermark is determined by one or more of:

a comparison of the extrapolated watermark symbols to symbols of the extracted tentative watermark;

performing an error correction code decoding of the extrapolated watermark symbols; and a comparison of the extrapolated watermarks to one or more pre-distorted watermark templates.

17. The device of claim 13, wherein:

the watermark extrapolator configured to form the extrapolated watermarks by, at least in-part, obtaining symbols of the potential watermark frame on a segment-by-segment basis, wherein each segment comprises two of more watermark symbols; and evaluator is configured to:

obtain a number of erroneous symbols in one or more segments;

assign weights to each of the one or more segments based, at least in-part, on the number of erroneous symbols in each of the one or more segments;

combine the assigned weights associated with the one or more segments to produce one or more weighted extrapolated watermark sections; and determine if the weighted extrapolated watermark sections, when combined with the detected tentative watermark, satisfy the desired probability of false watermark detection.

18. The device of claim 17, wherein the evaluator is configured to obtain the number of erroneous symbols in each of the one or more segments, at least in-part, by:
- comparing the symbols of the potential watermark frame in each of the one or more segments to one or more pre-distorted watermark templates; and
- producing a count for each of the one or more segments representative of a number of mismatched symbols between the symbols of the potential watermark frame in the one or more segments and the one or more pre-distorted watermark templates.

19. The device of claim 17, wherein a number of segments within the extrapolated watermark(s) is selected based on one or more of:
- an extent of the extracted tentative watermark;
- an amount of distortion present in the embedded host content; and
- a type of distortion present in the embedded host content.

20. The device of claim 17, wherein the evaluator is configured to assign the weight to a particular segment, at least in-part, based on an expected weight of an un-watermarked segment equal in length to the particular segment.

21. The device of claim 13, wherein the desired probability of false watermark detection corresponds to detection of a conclusive watermark.

22. The device of claim 13, wherein the evaluator is configured to report an estimate of amount and type of distortion, or combination of distortions, present in the embedded host content.

23. The device of claim 17, wherein an extent of each segment is determined based, at least in-part, on one or more of:
- an amount of distortion expected to be present in the embedded host content; and
- a type of distortion expected to be present in the embedded host content.

24. The device of claim 17, wherein the evaluator is configured to determine if the weighted extrapolated watermark sections, when combined with the detected tentative watermark, satisfy the desired probability of false watermark detection based on the one or more segments that collectively span a smaller extent than the tentative watermark.

25. A device, comprising:
- a processor; and
- a memory comprising processor executable code, the processor executable code, when executed by the processor, configures the device to:
  - extract a tentative watermark from an embedded host content, the tentative watermark representing a candidate watermark with an associated probability of false watermark detection that exceeds a desired probability of false watermark detection;
  - form one or more extrapolated watermarks by obtaining symbols of potential watermark frames that are positioned within the embedded host content at a predefined location relative to the extracted tentative watermark; and
  - determine if the extrapolated watermarks, when collectively assessed with the detected tentative watermark, satisfy a desired probability of false watermark detection.

26. A computer program product, embodied on a non-transitory computer readable medium, comprising:
- program code for extracting a tentative watermark from an embedded host content, the tentative watermark representing a candidate watermark with an associated probability of false watermark detection that exceeds a desired probability of false watermark detection;
- program code for forming one or more extrapolated watermarks by obtaining symbols of potential watermark frames that are positioned within the embedded host content at a predefined location relative to the extracted tentative watermark; and
- program code for determining if the extrapolated watermarks, when collectively assessed with the detected tentative watermark, satisfy a desired probability of false watermark detection.

27. A method comprising:
- extracting a potential watermark frame from a content embedded with one or more watermarks, each embedded watermark comprising a plurality of symbols that form a watermark frame;
- dividing the watermark frame into a plurality of segments, wherein each of the plurality of segments comprises two of more watermark symbols;
- assigning weights to each segment;
- combining the assigned weights associated with two or more segments to produce one or more weighted partial or full watermark frames; and
- determining if the one or more weighted full or partial watermark frames satisfy a desired probability of false watermark detection.

28. The method of claim 27, wherein dividing the watermark frame into the plurality of segments comprises selecting an extent of each segment in accordance with a likelihood of a burst error being present in the content, the burst error contaminating a plurality of consecutive watermark symbols.

29. The method of claim 27, wherein the weight to a particular segment is assigned, at least in-part, based on expected weight of an un-watermarked segment equal in length to the particular segment.

30. A device, comprising:
- an extractor implemented at least partially in hardware and configured to extract a potential watermark frame from a content embedded with one or more watermarks, each embedded watermark comprising a plurality of symbols that form a watermark frame; and
- an evaluator implemented at least partially in hardware and configured to:
  - divide the watermark frame into a plurality of segments, wherein each of the plurality of segments comprises two of more watermark symbols;
  - assign weights to each segment;
  - combine the assigned weights associated with two or more segments to produce one or more weighted partial or full watermark frames; and
  - determine if the one or more weighted full or partial watermark frames satisfy a desired probability of false watermark detection.

31. The device of claim 30, wherein the evaluator is configured to select an extent of each segment in accordance with a likelihood of a burst error being present in the content, the burst error contaminating a plurality of consecutive watermark symbols.

32. The device of claim 30, wherein the evaluator is configured to assign the weight to a particular segment, at least in-part, based on expected weight of an un-watermarked segment equal in length to the particular segment.

* * * * *